United States Patent [19]

Kaza et al.

[11] Patent Number: 4,574,057

[45] Date of Patent: Mar. 4, 1986

[54] COMPOSITIONS FOR PRINTING INK VARNISHES

[75] Inventors: Michael D. Kaza; Paul S. Sauers, both of Pittsburgh, Pa.

[73] Assignee: Neville Chemical Company, Pittsburgh, Pa.

[21] Appl. No.: 784,371

[22] Filed: Oct. 7, 1985

Related U.S. Application Data

[63] Continuation-in-part of Ser. No. 615,027, May 29, 1984, abandoned.

[51] Int. Cl.$^4$ .................. C08F 216/06; C09D 11/02; C09D 11/06; C09D 11/10
[52] U.S. Cl. .................................... 260/101; 106/20; 106/27; 106/28; 106/29; 106/30; 260/97.5; 260/DIG. 38; 526/283; 526/238.3; 526/290
[58] Field of Search .............. 260/DIG. 38, 97.5, 101; 106/20, 27, 28, 29, 30; 526/283, 238.3, 290

[56] References Cited

U.S. PATENT DOCUMENTS

| | | | |
|---|---|---|---|
| 3,903,034 | 9/1975 | Zabiak et al. | 260/DIG. 38 |
| 4,056,498 | 11/1977 | Laurito | 526/290 |
| 4,169,821 | 10/1979 | Werner et al. | 526/290 |
| 4,189,410 | 2/1980 | Laurito | 526/290 |
| 4,195,102 | 3/1980 | Turpin | 428/458 |
| 4,205,145 | 5/1980 | Tsuchiya et al. | 260/DIG. 38 |
| 4,371,676 | 2/1983 | Hoene | 526/290 |
| 4,433,100 | 2/1984 | Laurito | 526/290 |

FOREIGN PATENT DOCUMENTS

| | | | |
|---|---|---|---|
| 54-136911 | 10/1979 | Japan | 260/DIG. 38 |
| 55-66974 | 5/1980 | Japan | 260/DIG. 38 |

*Primary Examiner*—Ronald W. Griffin
*Attorney, Agent, or Firm*—Thomas F. McKnight; Walter H. Williams

[57] ABSTRACT

Synthetic resins suitable for use in printing ink compositions are described comprising (a) a predominant amount of dicyclopentadiene and lesser amounts of (b) at least one member selected from the group consisting of dimerized aliphatic, cyclic, and non-cyclic dienes of five carbon atoms; debutanized aromatic concentrates; C-5 olefins; acyclic conjugated C-5 dienes; mono-olefins, diolefins and polyenes each having more than five carbon atoms and having no aromatic rings, (c) at least one member selected from the group consisting of tall oil; fatty acid-containing materials and rosin acid-containing materials, (d) at least one ethylenically unsaturated lower aliphatic dicarboxylic acid or anhydride, and (e) at least one member selected from the group consisting of materials containing two or more reactive groups, at least one of which must be a hydroxyl group.

Additional synthetic resins suitable for use in printing ink compositions are described comprising Components (a) to (e) above in the absence of Component (d). Gelled printing ink compositions are further described comprising the reacted composition (a) to (e) above in combination with Component (f) at least one suitable gelling agent and Component (g) at least one suitable ink oil, and gelling the solution.

26 Claims, No Drawings

COMPOSITIONS FOR PRINTING INK VARNISHES

RELATED APPLICATION

This application is a continuation-in-part of copending U.S. Application Ser. No. 615,027, filed May 29, 1984, now abandoned.

BACKGROUND OF THE INVENTION

1. Field of the Invention

This invention relates generally to synthetic resins suitable for printing ink compositions and to processes for their production.

2. Summary of the Prior Art

Modified hydrocarbon resins suitable for a wide variety of end uses including coatings, asphalt floor tile, adhesives and printing ink compositions have been known for many years.

Novel compositions containing a predominant amount of (a) dicyclopentadiene and lesser amounts of (b) unsaturated hydrocarbons and (c) fatty acid and/or rosin-acid containing materials have been found to be useful in such end uses. See U.S. Pat. Nos. 4,056,498; 4,189,410; and 4,433,100.

The above patents also describe the further modification of these (a), (b), (c) compositions by lesser amounts of one or more ethylenically unsaturated lower aliphatic dicarboxylic acids or anhydrides thereby producing compositions which have found particular use as a replacement for rosin and rosin derivatives in printing ink compositions.

The search has continued, however, for new synthetic compositions having improved properties, particularly in the printing ink industry. The present invention was made as a result of that search.

SUMMARY OF THE INVENTION

Accordingly, a primary object of the present invention is to provide novel synthetic resins suitable for use in compositions such as printing inks.

These and other objects will be apparent to one skilled in the art from the following:

In accordance with one aspect of the present invention, a composition and process for producing a composition suitable for use in printing ink compositions comprising:

(a) a predominant amount of dicyclopentadiene; and lesser amounts of (b) at least one member selected from the group conisting of dimerized aliphatic cyclic and non-cyclic dienes of five carbon atoms; debutanized aromatic concentrates; C-5 olefins; acyclic conjugated C-5 dienes; mono-olefins, diolefins, and polyenes each having more than five carbon atoms and having no aromatic rings; and (c) at least one member selected from the group consisting of tall oil; fatty acid-containing materials and rosin acid-containing materials; and (d) at least one ethylenically unsaturated lower aliphatic dicarboxylic acid or anhydride; and (e) at least one member selected from the group consisting of materials containing two or more reactive groups, at least one of which must be a hydroxyl group are provided In a more particular aspect of the present invention, a composition and a process for producing a composition suitable for use in printing ink compositions comprising the reaction product of components (a), (b), (c), (d) and (e) above are provided.

The composition has a Ring and Ball softening point of from about 110° C. to about 180° C. preferably from about 130° C. to about 175° and most preferably from about 140° C. to about 160° C.; Gardner-Holdt solution viscosity at 25° C. (bubble seconds: 55%/Wt. resin in Magie 470 Ink Oil) of from about 100 to about 2,000, preferably from about 100 to about 600; a Hydrocarbon Dilution Tolerance test value (Wt. % Non-Volatile at Cloud Point) of from about 10.0 to about 40.0 (55%/Wt. resin in Magie 470 Ink Oil), preferably from about 15.0 to about 30.0; a Hydroxyl Number of from about zero to about 10.0, preferably from about zero to about 5.0; and an Acid Number of from about 10.0 to about 40.0, preferably from about 10.0 to about 30.0 and most preferably from about 10.0 to about 20.0.

Processes for producing a composition comprising reacting Components (a), (b), (c), (d), and (e), above and as hereinafter described, either simultaneously in a one-step reaction process or as a two-step reaction process whereby Components (a), (b), (c), and (e) are co-polymerized to form a base resin and said base resin is thereafter reacted with Component (d), are also provided.

In another aspect of the present invention, a composition and process for producing a composition suitable for use in printing ink compositions comprising Components (a), (b), (c), and (e) above, and as hereinafter described, are provided. The composition has a Ring and Ball softening point of from about 100° C. to about 170° C., preferably from about 115° C. to about 135° C.; Gardner-Holdt solution viscosity at 25° C. (bubble seconds; 55% Wt. resin in Magie 470 Ink Oil) of from about 15.0 to about 50.0, preferably from about 15.0 to about 30.0; a Hydrocarbon Dilution Tolerance test value (Wt. % Non-Volatile at Cloud Point) of from about 1.0 to about 10.0 (55%/Wt. resin in Magie 470 Ink Oil), preferably from about 1.0 to about 6.0; a Hydroxyl Number of from about 10.0 to about 60.0, preferably from about 20.0 to about 40.0; and an Acid Number of from about 1.0 to about 10.0, preferably from about 1.0 to about 5.0.

In a more particular aspect of the present invention, a composition and process for producing a composition suitable for use in printing ink compositions comprising a polymerized mixture of Components (a), (b), (c), and (e) above are also provided.

The central feature of the present invention is the discovery of a novel synthetic resin having properties desirable for use in printing ink compositions. The properties include (i) reasonably high softening points; (ii) light color, e.g., up to about 3, and more typically up to about 2 (Barrett Method), or between about 9 and about 18 (Gardner Method); (iii) reasonably good solubility in the relatively poor solvents typically used in inks, e.g., Magie 470 Oil (heat-set) or 42 Kauri Butanol ink solvent; (iv) the ability to "wet" pigments in ink formulae; and (v) a reasonably high solution viscosity in relatively low solvent power ink solvents at 50% to 60% resin concentration (the importance of the property is pointed out by the fact that in certain instances the ink industry requires a relatively viscous paste ink consistancy for application, and in other instances may wish a substantially less viscous ink formulation).

The resins of the present invention generally exhibit a high level and wide range of solubility-compatibility properties. Moreover, the resins of the present invention can be used as the sole resin or in combination with or as an extender for other resins in printing ink compositions. And in such printing ink compositions, the resins of the present invention have also been found to give improved solvent release and improved gloss, as well as giving excellent ink drawdowns and decreased odor. Such resins of this present invention are useful in the foregoing respects, and also find use when incorporated into a gelled varnish formulation, e.g., with an ink oil and gelling agent. The resins of the present invention are of particular value as lithographic ink resins, having increased gelability properties with aluminum chelates, alkoxides and soaps. The higher gel structures obtained by gelling the (a), (b), (c), (d), (e) invention resins are from at least 5 times to 100 times more intense that the prior art (a), (b), (c), (d) resins, as evidenced by Laray viscosity, yield value, and the shortness factors. Thus, in a more particular aspect of the present invention, a composition and process for producing a gelled composition suitable for use in printing ink compositions comprising Components (a), (b), (c), (d), and (e) above and as hereinafter described plus Components (f) a suitable gelling agent; and (g) a suitable ink oil are also provided. The composition has a Laray Viscosity (@2500 sec$^{-1}$, 30° C., poise) value of from about 100 to about 2,000, preferably from about 100 to about 600; a Yield Value @2.5 sec$^{-1}$, dynes/cm$^2$) of from about 2,500 to about 100,000, preferably from about 2,500 to about 30,000; and a Shortness Factor value of from about 8 to about 70, preferably from about 30 to about 60.

Other aspects and advantages of the present invention will become apparent to one skilled in this art from the following descriptions of the preferred embodiments.

DESCRIPTION OF THE PREFERRED EMBODIMENTS

In the present invention, the first principal Component, dicyclopentadiene (Component (a)), is of the same composition and is used in the same amounts as that previously described and disclosed in U.S. Pat. Nos. 4,056,498, 4,189,410 and 4,433,100, all of which description and disclosure are specifically incorporated herein by reference.

As more particularly described in U.S. Pat. No. 4,056,498, a substantially pure, e.g., 95% to essentially 100%, dicyclopentadiene feed stock may be used as Component (a). Alternatively, dicyclopentadiene-rich hydrocarbon fractions may also be used. Typically such dicyclopentadiene-rich hydrocarbon fractions contain at least about 40%, and more typically at least about 70% dicyclopentadiene and minor or lesser amounts, e.g., from about 1% to about 30% by weight of dimethyldicyclopentadienes and codimers of cyclopentadiene and methylcyclopentadiene. Small amounts, e.g., less than about 5%, of other materials such as benzene, and which do not materially affect the performance of the dicyclopentadiene-rich hydrocarbon fractions as used in the present invention, may also be present in such dicyclopentadiene-rich hydrocarbon fractions.

As more particularly set out in U.S. Pat. No. 4,189,410, it may also be possible to employ as the first principal Component essentially 100% by weight of methyldicyclopentadiene or dimethyldicyclopentadienes. Other materials may be present in the dicyclopentadiene-rich hydrocarbon fraction in amounts which do not materially affect the performance of the dicyclopentadiene-rich hydrocarbon fraction as used in the present invention. Other materials which may be present include, e.g., aromatic olefinic monomers such as vinyltoluenes, styrene, alphamethylstyrene, indene, coumarone, methylcoumarone, dimethylstyrenes and methylindenes, other inert aromatic hydrocarbons such as benzene, toluene, C-8 aromatics, cumene, ethyltoluenes, 1,2,4-trimethylbenzene, 1,2,3-trimethylbenzene, 1,3,5-trimethylbenzene, indane and naphthalene, various inert non-aromatic hydrocarbons, and diolefinic cyclic hydrocarbons such as C-5 codimers and C-4 to C-5 codimers including vinylnorbornenes. The diolefinic cyclic hydrocarbons may be present in amounts up to about 15 weight percent based on the total weight of the first principal component. Generally, the aromatic olefinic monomers should be present in the dicyclopentadiene-rich hydrocarbon feed stream in an amount such that there is present in the improved resins of the present invention less than about 35 weight percent reacted or combined aromatic olefinic monomers based on the total weight of the resin. The inert material, including inert aromatic hydrocarbons and inert non-aromatic hydrocarbons, may be present in the dicyclopentadiene-rich hydrocarbon fraction in an amount of less than about 30 weight percent based on the total weight of the three principal components of the reaction mixture including inerts. The phrase "inert" is used herein to designate hydrocarbon materials which, while they may be involved in some side reactions during the production of the resins of the present invention, are not involved in the reactions which directly result in production of those resins. Preferably, such inerts are present in amounts less than about 15 weight percent. Typically, non-aromatic inert hyrocarbons are preferred.

In the present invention, Component (a) is present in the reaction mixture in a predominant amount, i.e., in an amount greater than the other principal components of the reaction mixture. For example, Component (a) may be present in the base resin (i.e., comprised of Components (a), (b), (c) and (e)) and modified base resin (i.e. composed of Components (a), (b), (c), (d) and (e)) in an amount of from about 40 percent to about 85 percent or more, preferably in an amount of from about 50 percent to about 75 percent, based on the total weight of the principal components in the reaction mixture.

In the gelled varnish composition of the present invention, Component (a) is present in a predominant amount, (i.e., in amount greater than the other non-volatile and principal Components of the reaction mixture) with respect to Components (b), (c), (d) and (e); but may be present in the gelled varish composition in lesser amount than Component (g), ink oil, and may in certain cases be present in lesser amount than Component (f), gelling agent. In the gelled varnish composition, Component (a) is present in an amount from about 10 percent to about 60 percent, preferably in an amount of from about 15.0 percent to about 55 percent, based on the total weight of the gelled varnish composition.

In the present invention, the second principal Component (Component (b)) is of the same composition and is used in the same amounts as that previously described and disclosed in U.S. Pat. Nos. 4,056,498; 4,189,410; and 4,433,100, all of which description and disclosure are specifically incorporated herein by reference.

As particularly set out in U.S. Pat. No. 4,056,498, the second principal Component in the initial reaction mixture may be itself a mixture of dimerized conjugated aliphatic, cyclic and noncyclic dienes of five carbon atoms, e.g., a mixture consisting essentially of dimers of isoprene, cis-piperylene, trans-piperylene, and cyclopentadiene. More particularly, a typical second Component mixture may consist essentially of from about 70 percent to about 90 percent dimers of isoprene, cis-piperylene and trans-piperylene and codimers, trimers and cotrimers of isoprene, cis-piperylene, trans-piperylene and cyclopentadiene, and from about 30 percent to about 10 percent higher polymers of isoprene, cis-piperylene, trans-piperylene and cyclopentadiene. Feed stocks of this type are described in more detail in U.S. Pat. No. 3,290,275 and U.S. Pat. No. 3,478,005, both of which are incorporated herein by reference.

As taught in U.S. Pat. No. 4,189,410, it may also be possible to employ as the second principal Component (Component (b)) in the initial reaction mixture at least one hydrocarbon-containing material selected from the group consisting of debutanized aromatic concentrates, C-5 olefins and acyclic, conjugated C-5 dienes. More particularly, debutanized aromatic concentrates as contemplated herein include Debutanized Aromatic Concentrate-B (DAC-B) and Debutanized Aromatic Concentrate-C (DAC-C). Typical of the second component C-5 olefins are 1-pentene, 2-methyl-1-butene, 2-methyl-2-butene, cyclopentene, cis-2-pentene and trans-2-pentene. The term "acyclic, conjugated C-5 dienes" as used herein is meant to consist essentially of isoprene, cis-piperylene and trans-piperylene. The debutanized aromatic concentrates, C-5 olefins and acyclic, conjugated C-5 dienes of the second principal component may include cyclopentadiene, preferably in minor amounts. A typical second component mixture may consist essentially of an equal volume percent mixture of 2-methyl-2-butene, 1-pentene, cis-2-pentene, mixed 2-pentenes and cyclopentene. Another typical second component may consist of about 20 volume percent isoprene and about 80 volume percent piperylenes.

As described in U.S. Pat. No. 4,433,100, it may also be possible to employ unsaturated hydrocarbons (mono-olefins, diolefins, and polyenes) having more than five carbon atoms and no aromatic rings in their structure as the second principal component (Component (b)) in the reaction mixture to produce the resins of this invention. U.S. Pat. No. 4,433,100 more particularly teaches that Component (b) may be a single compound selected from any of twenty-two groups of non-aromatic, unsaturated materials described in detail in Columns 8–27 therein, or may be at least two or more compounds selected from any one of the twenty-two groups of such materials, or may be at least two or more compounds selected from any number of the twenty-two groups described. Illustrative examples of component (b) include mono-olefins, diolefins, and polyenes, each having more than five carbon atoms, and having no aromatic rings. All of the illustrative examples of Component (b) set forth in U.S. Pat. No. 4,433,100 in columns 8–27 are incorporated herein by reference.

In the present invention, Component (b) is typically present in the base resin (i.e., comprised of Components (a), (b), (c) and (e)) and modified base resin (i.e., comprised of Components (a), (b), (c), (d) and (e)) in an amount substantially less than the dicyclopentadiene component. For example, the second component may be present in an amount from about 5 percent to about 40 percent and more preferably from about 5 percent to about 30 percent and most preferably from about 5 percent to about 20 percent of the total weight of the principal Components in the reaction mixture.

In the gelled varnish composition of the present invention, Component (b) is similarly present in an amount substantially less than Component (a). For example, Component (b) may be present in the gelled varnish composition in an amount from about 1.0 percent to about 30 percent and more, preferably from about 1.5 percent to about 25.0 percent, and most preferably from about 2.5 percent to about 24.0 percent of the total weight of the Components in the gelled varnish composition.

In the present invention, the third principal Component (Component (c)) may be any of the various tall oil compositions, fatty acid-containing materials, or rosin acid-containing materials or mixtures thereof previously described and disclosed in detail in U.S. Pat. Nos. 4,056,498; 4,189,410; and 4,433,100; all of which description and disclosure are specifically incorporated herein by reference.

In the base resin (i.e., comprised of Components (a), (b), (c) and (e)) and modified base resin (i.e., comprised of Components (a), (b), (c), (d) and (e)), when tall oil or predominantly fatty acid-containing materials are used as Component (c), the amounts used may be from about 5 percent to about 30 percent, preferably from about 10 percent to about 30 percent, based on the total weight of the principal reactive components. In the gelled varnish composition, when tall oil or predominantly fatty acid-containing materials are used as Component (c), the amounts used may be from about 1.0 percent to about 25.0 percent, preferably from about 2.0 percent to about 25.0 percent, based on the total weight of all Components in the gelled varnish composition. When predominately rosin acid-containing materials are used as Component (c) in the base resin and modified base resin, the amounts used may be from about 5 percent to about 15 percent, preferably from about 5 percent to about 10 percent by weight of the reaction mixture.

When predominantly rosin acid-containing materials are used as Component (c) in the gelled varnish composition of the present invention, the amounts used may be from about 1.0 percent to about 18.0 percent, preferably from about 2.0 percent to about 15 percent by weight of the reaction mixture.

U.S. Pat. No. 4,056,498 specifically discloses that the third principal component (Component (c)) in the initial reaction mixture is tall oil. The tall oil composition typically utilized is refined tall oil, i.e., crude tall oil which has been refined such as by distillation. The refined tall oil typically consists essentially of a predominant amount of tall oil fatty acids and a lesser amount of tall oil rosin acids. For example, the refined tall oil may contain from about 50 percent to about 70 percent fatty acids, and from about 30 percent up to about 50 percent rosin acids. Other tall oil compositions containing, for example, from about 10 percent to about 90 percent fatty acids and from about 90 percent to about 10 percent rosin acids may also be used. Tall oil and particularly refined or distilled tall oil are well known per se and the manner in which they are produced, derived or obtained is not a part of the present invention. Its general composition is described in U.S. Pat. No. 4,056,498.

U.S. Pat. No. 4,189,410 teaches that it may also be possible to employ as the third principal component (Component c)) of the initial reaction mixture at least one member selected from the group consisting of fatty acid-containing materials and rosin acid-containing materials. The fatty acid-containing materials include saturated fatty acid-containing materials, unsaturated fatty acid-containing materials and mixtures thereof. Generally, the fatty acids in the fatty acid-containing materials are saturated or unsaturated monocarboxylic acids containing from about 12 to about 22 carbon atoms per molecule or mixtures thereof. Typical fatty acid-containing materials include, e.g., vegetable acids, animal acids, fish acids and tall oil and may include olefinic fatty acids, diolefinic fatty acids, conjugated diolefinic fatty acids, polyolefinic fatty acids as more particularly set out in U.S. Pat. No. 4,189,410.

Typical rosin acid-containing materials include, e.g., rosins, particularly gum rosin, wood rosin and tall oil rosin. Rosin acids typically have the molecular formula, $C_{20}H_{30}O_2$. The rosin acids may include, e.g., abietic acid, dehydroabietic acid, palustric acid, neoabietic acid, isopimaric acid, dihydroabietic acid, tetrahydroabietic acid, isodextropimaric acid, sandaracopimaric acid, levo-pimaric acid, elliotinoic acid, dihydroisopimaric acid, dihydropimaric acid, tetrahydroisopimaric acid and tetrahydropimaric acid. The various rosin acids such as tall oil rosin, gum rosin and wood rosin acids are discussed in greater detail, e.g., in Kirk-Othmer Encyclopedia of Chemical Technology, Volume 17, pp. 475-508 (1968), which is herein incorporated by reference.

In the present invention, the fourth principal Component (Component (d)) is of the same composition and is used in the same amounts as that previously described and disclosed in U.S. Pat. Nos. 4,056,498; 4,189,410; and 4,433,100; all of which description and disclosure are specifically incorporated herein by reference.

As more particularly described in U.S. Pat. No. 4,056,498, Component (d) is an ethylenically unsaturated lower aliphatic dicarboxylic acid or anhydride. Maleic anhydride and fumaric acid are preferred. Maleic anhydride is most preferred and has been found to yield a resin having the best combination of properties for usage in printing ink compositions. Other ethylenically unsaturated lower aliphatic dicarboxylic acids or anhydrides which may be suitable include among others glutaconic acid, itaconic acid, citraconic acid, mesaconic acid and tetrahydrophthalic anhydride.

Additional illustrative compounds included in the above description which are specifically mentioned in U.S. Pat. No. 4,189,410 include half esters of maleic anhydride. Other compounds which may be suitable include glutaconic anhydride, itaconic anhydride methyltetrahydrophthalic anhydride, and tetrahydrophthalic acid.

In the present invention, any of the Component (d) illustrative type compounds listed in U.S. Pat. Nos. 4,056,498 and 4,189,410 may be used. Component (d) is present in the modified base resin (i.e., comprised of Components (a), (b), (c), (d) and (e)) in an amount from about one to about ten parts and preferably from about three to about five parts. Component (d) is present in the gelled varnish composition in an amount of from about 0.25 to about 10.0 parts and preferably from about 0.5 to about 5.0 parts, based on the total weight of all the components in the gelled varnish composition.

In the present invention, Component (e) is at least one member selected from the group consisting of materials containing two or more reactive groups, at least one of which must be a hydroxyl group.

Component (e) is present in the base resin and modified base resin in an amount from about one to about ten percent, by weight, and preferably from 2 to about 6 percent. Component (e) is present in the gelled varnish composition in an amount of from about 0.25 to about 10.0 percent, by weight, and preferably from about 0.5 to about 5.0 percent, by weight based on the total weight of all the components in the gelled varnish composition.

Illustrative classes of materials which can serve as Component (e) in the present invention are alcohols, glycols, glycerols, polyhydric alcohols, phenols, and phenolic resins.

The above classes of materials which can serve as Component (e) will have at least one of the following general chemical structures.

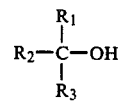

where $R_1$, $R_2$, $R_3$, may independently be hydrogen, aliphatic, cycloaliphatic, or aromatic radicals; which may contain carbon to carbon unsaturation (ethylenic or acetylenic) and may also consist of elements other than carbon and hydrogen.

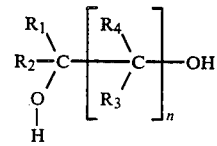

where n is greater than zero and where $R_1$, $R_2$, $R_3$, $R_4$ may independently be hydrogen, aliphatic, cycloaliphatic, or aromatic radicals; which may contain carbon to carbon unsaturation (ethylenic or acetylenic) and may also consist of elements other than carbon and hydrogen.

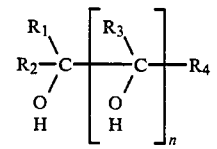

where n is greater than zero and where $R_1$, $R_2$, $R_3$, $R_4$ may independently be hydrogen, aliphatic, cycloaliphatic, or aromatic radicals; which may contain carbon to carbon unsaturation (ethylenic or acetylenic) and may also consist of elements other than carbon and hydrogen.

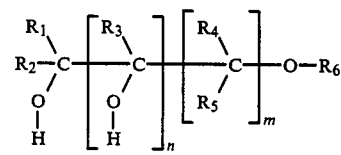

where n can be zero or any positive integer, m is greater than zero, and $R_1$, $R_2$, $R_3$, $R_4$, $R_5$, $R_6$ may independently be hydrogen, aliphatic, cycloaliphatic, or aromatic radicals; which may contain carbon to carbon unsaturation (ethylenic or acetylenic) and may also consist of elements other than carbon and hydrogen.

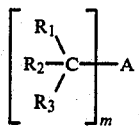

Where A is

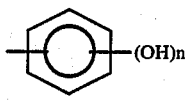

and n=1-3, and m=zero-5, $R_1$, $R_2$, $R_3$ may independently be hydrogen, aliphatic, cycloaliphatic, or aromatic radicals; which may contain carbon to carbon unsaturation (ethylenic or acetylenic) and may also consist of elements other than carbon and hydrogen, and $R_1$, $R_2$, $R_3$ may additionally be equal to A.

As used in this invention the term alcohols means mono-hydric alcohols; the term glycols means di-hydric alcohols and glycol ethers; the term glycerols means any trihydric alcohol and their mono esters; the term polyols means any compound containing four or more alcoholic OH groups; the term phenols means any compound containing one or more phenolic OH groups and their mono-ethers; the term phenolic resin means the acid or base-catalyzed liquid or resinous reaction product of any phenolic compound and any aldehyde compound having phenolic/aldehyde mol ratios of from 0.5-3.0.

The mono-hydric alcohols, glycols and glycol ethers, glycerols and mono-glycerides, polyhydric alcohols, phenols and phenolic resins which can serve as Component (e) in the present invention include materials such as: saturated aliphatic alcohols; unsaturated aliphatic alcohols; saturated and unsaturated aromatic alcohols; saturated and unsaturated alicyclic alcohols; saturated and unsaturated heterocyclic alcohols; saturated and unsaturated acetylenic alcohols; saturated and unsaturated terpene alcohols; saturated glycols; polyethylene glycols and polypropylene glycols (glycol ethers); ethylenically unsaturated glycols; acetylenic glycols; saturated glycerols and monoglycerides; ethylenically unsaturated glycerols and monoglycerides; acetylenic glycerols and monoglycerides; saturated polyhydric alcohols (polyols); sugars and sugar alcohols (polyols); ethylenically unsaturated polyhydric alcohols (polyols); acetylenic polyhydric alcohols (polyols); phenol, cresols and xylenols; alkyl and aryl phenols; dihydric phenols and bisphenols; polyhydric phenols; phenolic resins (novolak type), phenolic resins (resol type), and phenolic resins which have been modified by rosin, ester gum, or rosin derivatives.

Specific illustrative materials among the alcohols which may be used as Component (e) are: 4-methyl-2-pentanol; 3,5-dimethyl-1-hexanol; 2,6-dimethyl-4-heptanol; allyl alcohol; crotyl alcohol; divinyl carbinol; 1-vinyl cyclohexen-1-ol; orthohydroxy benzyl alcohol; cinnamyl alcohol; 3-phenyl-1-buten-3-ol; cyclopentanol; cyclohexanol; 2-vinylcyclohexanol-1; furfuryl alcohol; 3-hydroxymethyl furfural; 3-vinylfurfuryl alcohol; propargyl alcohol; 3-butyn-1-ol; 1-ethynylcyclohexan-1-ol; citronellol; geraniol; linalool; and myrcenol.

Specific illustrative materials among the di- and polyhydric alcohols which may also be used as Component (e) are: ethylene glycol; 1,3-butylene glycol; di-ethylene glycol; 1,4-cyclohexane-dimethanol; liquid polyethylene glycol (200 mw); solid polyethylene glycol (1000 mw); liquid polypropylene glycol (150 mw); liquid polypropylene glycol (1200 mw); 2-butene-1,4-diol; 2-butyne-1,4-diol; 2,5-dimethyl-3-hexyne-2,5-diol; 3,6,dimethyl-4-octyne-3,6-diol; glycerol; diglycerol; glycerol mono-laurate; 4-cyclopentene-1,2,3-triol; 5-methylene-1,2,3-cyclohexenetriol; 1-(5-methyl-3-furyl)-1,2,3-propanetriol; 2-hexyne-1,4,5-triol-4,5-dimethyl; 2-pentyne-1,4-diol,4-(1-hydroxycyclohexyl); 4-nonyne-2,3,6-triol-2,3-dimethyl; 1,2,4-butanetriol; pentaerylthritol; trimethylolethane; cyclohexan-1,3,5-triol; sorbitol; d-mannitol; d-glucuronic acid; sucrose; sucrose-allyl ether; 2-buten-1,1,3-triol; 1-(hydroxymethyl)-4-cyclohexene-1,2,3-triol; 3,4,5,6-tetrahydroxy-2-methoxy-5-methyl-2-cyclohexene-1-one; 4-octyne-2,3,6,7-tetrol-2,3,6,7-tetramethyl; 5-decyne-3,4,7,8-tetrol-3,4,7,8-tetramethyl; and 6-dodecyne-4,5,8,9-tetrol-2,4,5,8,9,11-hexamethyl.

Additional specific illustrative materials among the phenols and phenolic resins which may also be used as Component (e) are: phenol; o-cresol; p-cresol; 3,5-dimethyl phenol; ortho-allyl phenol; 2-t-butyl phenol; 4-t-butyl phenol; 2-phenyl phenol; nonyl phenol; resorcinol; bis-phenol F (2,2'-methylene bis-phenol); bis-phenol A (4,4'-isopropylidene-diphenol); pyrogallol; 1,2,3,4-benzene tetrol; gallic acid; phenolic resins (novolak type): Rohn & Haas' Amberol ST-149; Union Carbide's CK-2103; Reichhold Chemical's Varcum 29-003; Union Carbide's CK-2500; Reichhold Chemical's Varcum 29-005; phenolic resins (resol type): Reichhold Chemical's Varcum 29-105; Rohm & Hass' Amberol ST-137; Union Carbide's CK-1282 and CK-1636; phenolic resins (modified type) as by rosin, rosin derivatives, ester gum (the glycerol ester of rosin acids): Reichhold Chemical's Varcum 29-038 and Varcum 29-030; and Spencer-Kellogg Division of Textron's Ester Gum B.

Literature references which more fully describe the above classes of materials, whose members are suitable for use as Component (e), and which in addition list further illustrative examples of specific materials which are suitable for use as Component (e), include the following, taken from Kirk-Othmer's "Encyclopedia of Chemical Technology"; published by Interscience Encyclopedia, Inc. NYC (1st edition) and by John Wiley & Sons, NYC (2nd and 3rd editions) under the following topics, arranged alphabetically:

Acetylene-derived Chemical, 3rd edition, Vol. 1 (1978), pp 244-276; Alcohols, 1st edition, Vol. 1 (1947), pp 303-314; Alcohols, Higher, 1st edition, Vol. 1 (1947), pp 315-321; Alcohols, Higher aliphatic, 3rd edition, Vol. 1 (1978), pp 716-754; Alcohols, Higher Polyhydric, 1st edition, Vol. 1 (1947), pp 321-333; Alcohols, Polyhydric, 2nd edition, Vol. 1 (1963), pp 569-598; Alcohols, Polyhydric (Sugar), 3rd edition, Vol. 1 (1978) pp 754-778; Other Polyhydric Alcohols, 3rd edition, Vol. 1 (1978), pp 778-789; Alcohols, Unsaturated, 2nd edition, Vol. 1 (1963), pp 598-638; Alkyl Phenols, 3rd edition, Vol. 2 (1978), pp 72-96; Allyl compounds, 3rd edition, Vol. 2 (1978), pp 97-108; Cresols, 2nd edition, Vol. 6 (1965), p 434-444; Furan Derivaties, 3rd edition, Vol. 11 (1980), pp 499-527; Glycols, 1st edition, Vol. 7 (1951), pp 237-263; 1,3-Butylene Glycol, 3rd edition, Vol. 11 (1980), pp 956-962; Glycols; Ethylene and Propylene 3rd edition, Vol. 11 (1980), pp 933-956;

Other Glycols, 3rd edition, Vol. 11 (1980), pp 963–971; Glycerol, 3rd edition, Vol. 11 (1980), pp 921–932; Glycerol, 1st edition, Vol. 7 (1951), pp 216–229; Hydroquinone, Resorcinol, and Catechol, 3rd edition, Vol. 13 (1981), pp 39–69; Phenol and Phenols, 1st edition, Vol. 10 (1953), pp 279–330; Phenolic Resins, 3rd edition, Vol. 17 (1982), pp 384–416; Phenolic Resins, 2nd edition, Vol. 15 (1968), pp 176–208; Phenolic Resins and Plastics, 1st edition, Vol. 10 (1953), pp 335–370; Poly Hydroxy Benzenes, 3rd edition, Vol. 18 (1982), pp 670–704; Sugar (Cane), 3rd edition, Vol. 21 (1983), pp 878–903; Sugar (Special), 3rd edition, Vol. 21 (1983) pp 944–948; Sugar Derivatives, 2nd edition, Vol. 19 (1969), pp 221–233; Sugars Derivatives, 1st edition, Vol. 13 (1954) pp 261–270; Terpenoids, 3rd edition, Vol. 22 (1983), pp 709–762; Terpenes and Terpenoids, 2nd edition, Vol. 19 (1969); pp 803–838; all of which are incorporated herein by reference.

An excellent listing of commercially available phenolic resins of the novolak type, resol type, and rosin, rosin derivatives and ester group modified types may be found in The National Paint and Coatings Association's "Raw Materials Index Resins Section" (1982 edition), which is incorporated herein by reference.

Literature references to certain specific compounds illustrative of the class of ethylenically unsaturated glycerols may be found in Chemical Abstracts as follows: 4-cyclopentene-1,2,3-triol, $C_5H_8O_3$, Registry No. 29782-84-1, C.A. 73 108919c (1970), C.A. 74 41977v (1971), C.A. 75 130043a (1971); 5-methylene-1,2,3-cyclohexenetriol, $C_7H_{12}O_3$, Registry No. 34321-21-6, C.A. 75 88878z (1971); and 1-(5-methyl-3-furyl)-1,2,3-propanetriol, $C_8H_{12}O_4$, Registry No. 33597-67-0, C.A. 75 72802j (1971); all of which are incorporated herein by reference.

Literature reference to certain specific compounds illustrative of the class of acetylenic glycerols may be found in Chemical Abstracts as follows: 4,5-dimethyl-2-hexyne-1,4,5-triol, $C_8H_{14}O_3$, Registry No. 50880-61-1, C.A.83 205431b (1975) and C.A. 80 26800n (1974); 4-(1-hydroxycyclohexyl)-2-pentyne-1,4-diol, $C_{11}H_{18}O_3$, Registry No. 3623898-9, C.A. B 83 205 431b (1975), C.A. 80 26 800n (1974), C.A. 76 139 884d (1971); 2,3-dimethyl-4-nonyne-2,3,6-triol, $C_{11}H_{20}O_3$, Registry No. 5923-13-7, C.A. 83 205431b (1975); all of which are incorporated herein by reference.

Literature references to certain specific compounds illustrative of the class of ethylenically unsaturated polyhydric alcohols include the following:

2-butene-1,1,3-triol, $C_4H_8O_3$, Registry No. 28437-77-6, C.A. 73 9366p (1970); 1-(hydroxymethyl)-4-cyclohexene-1,2,3-triol, $C_7H_{12}O_4$, Registry No. 17550-43-5, C.A. 68 59383 (1968), and 3,4,5,6-tetrahydroxy-2-methoxy-5-methyl-2-cyclohexene-1-one, $C_8H_{12}O_6$, Registry No. 28148-63-2, C.A. 73 11536u (1970); all of which are incorporated herein by reference.

Literature references to certain specific compounds illustrative of the class of acetylenic polyhydric alcohols may be found in Chemical Abstracts as follows: 2,3,6,7-tetramethyl-4-octyne-2,3,6,7-tetrol, $C_{12}H_{22}O_4$, Registry No. 5923-14-8, C.A. 98 44119y (1983), C.A. 92 67649m (1980); 3,4,7,8-tetramethyl-5-decyne-3,4,7,8-tetrol, $C_{14}H_{26}O_4$, Registry No. 64577-38-4, C.A. 93 123676c (1980), C.A. 92 67649m (1980), C.A. 87 175643k (1977); and 2,4,5,8,9,11-hexamethyl-6-dodecyne-4,5,8,9-tetrol, $C_{18}H_{34}O_4$, Registry No. 64577-39-5, C.A. 87 175643k (1977), C.A. 92 67649m (1980); all of which are incorporated herein by reference.

In the present invention, Components (a), (b), (c), and (e) may be polymerized or reacted to form a base resin which may be used directly in various coatings and/or printing compositions.

The four principal components of the base resin (a), (b), (c) and (e) may be reacted or polymerized in any sequence or combination to produce the novel resins of the present invention. In addition, these components may be reacted over a wide range of temperatures, for example, reaction temperatures may range from about 200° C., up to about 290° C., preferably from about 230° C. to about 270° C., and most preferably from about 255° C. to about 265° C.

The pressures employed in the initial reaction zone to produce the base resin are not thought to be critical, with the pressure sufficient to prevent substantial loss by evaporation of the reactants typically being used. Subatmospheric, atmospheric, and superatmospheric pressures may be employed, and autogenous pressure in a substantially sealed reaction vessel is typically convenient.

If desired, inert diluents such as toluene or benzene may also be present in the reaction zone or mixture in an amount for example, of up to about 30 percent, preferably in an amount less than about 15 percent, based on the total weight of the reaction mixture including the diluent.

The initial polymerization reaction is typically characterized as a thermal polymerization and is most preferably conducted in the absence of any catalyst.

Alternately, the initial reaction mixture containing the above described four principal reactants or components may be catalytically polymerized. Typical of catalysts which may be employed in the initial reaction are peroxides such as di-tert-butylperoxide; dilauroylperoxide; dicumylperoxide; 2,5-bis(tert-butylperoxy)hexane; 2,5-dimethyl-2,5-bis(tert-butylperoxy)-hexane; dibenzoylperoxide; cumene hydroperoxide and/or Freidel-Crafts metal salt catalysts such as aluminum chloride, stannic chloride, borom trifluoride, boron trifuluoride complexes e.g., boron trifluoride hydrate, boron trifluoride ethyl ether, and boron trifluoride phenol. If catalysts are employed, it is possible to work at temperatures from about −20° C. to about 270° C., preferably from about 40° C. to about 250° C.

Any conventional reaction vessel may be employed for this initial polymerization reaction, and the polymerization reaction may be conducted in a batch, semi-continuous or continuous manner. Preferably, the polymerization reaction is carried out under agitation, e.g., in a stirred reactor vessel.

The initial reaction mixture is typically maintained at reaction temperatures until the desired degree of polymerization is reached. Typically, reaction is maintained until a base resin having a Ring and Ball softening point of from about 100° C. to about 170° C., more typically about 115° C. to about 135° (as measured by ASTM E 28, herein incorporated by reference) and an Acid Number of from about 1.0 to about 10, more typically from about 1.0 to about 5.0 is produced.

The general range of base resin properties may include the following: a color of from about 9 to about 18 (as measured by the Gardner method ASTM D 1544, herein incorporated by reference), preferably from about 13 to about 17; a definite standard Stoddard solubility precipitation temperature (herein referred to as definite Stoddard solubility) of from less than about −60° C. to about +40° C., preferably from about −50° C. to about +20° C. (point of definite cloud as measured by the method set out in U.S. Pat. Nos. 2,565,222; 3,422,053; and 3,468,837; (herein incorporated by reference); a resin mixed (normal heptane) aniline point, hereinafter resin aniline point, of from about 40° to about 110° C., preferably from about 55° C. to about 85° C. (as measured by ASTM D 1012 herein incorporated by reference); an ASTM Wijs Iodine Number of from about 120 to about 200, preferably from about 130 to about 180 (as measured by ASTM D 1959, Wijs, herein incorporated by reference); and molecular weight (number average) of from about 750 to about 1500, preferably from about 900 to about 1300. The base resin exhibits a Ring and Ball softening point of from about 100° C. to about 170° C., preferably from about 115° C. to about 135° C.; Gardner-Holdt solution viscosity at 25° C. (bubble seconds) of from about 15.0 to about 50.0, preferably from about 15.0 to about 30.0; a Hydrocarbon Dilution Tolerance test value (Wt. % Non-Volatile at Cloud Point) of from about 1.0 to about 10.0 (55%/Wt. resin in Magie 470 Ink Oil), preferably from about 1.0 to about 6.0; a Hydroxyl Number of from about 10.0 to about 60.0, preferably from about 20.0 to about 40.0; and an Acid Number of from about 1.0 to about 10.0, preferably from about 1.0 to about 5.0.

The resulting resin is typically recovered from the reaction mixture by conventional methods such as distillation, e.g., steam distillation or stripping; such recovery techniques are well known to those skilled in the art. U.S. Pat. No. 4,189,410 teaches that other conventional recovery methods known to those skilled in the art may be used. Similar recovery methods may be used in the present invention.

In the present invention, Components (a), (b), (c) and (e) comprise at least about 80 percent of the total amount of polymerizable constituents of monomers of the reaction mixture, preferably comprise above about 90 percent of the total amount of polymerizable constituents of the reaction mixture, and most preferably comprise essentially 100 percent of the total amount of polymerizable constituents of the reaction mixture.

If desired, aromatic olefinic monomers such as vinyltoluene, styrene, alphamethylstyrene, indene, coumarone, methylcoumarone, dimethylstyrenes and methylindenes, or inert aromatic diluents such as toluene, benzene, C-8 aromatics, cumene, ethyltoluenes, 1,2,4-trimethylbenzene, 1,2,3-trimethylbenzene, 1,3,5-trimethylbenzene indane and naphthalene, may also be present in the reaction zone or mixture. Such materials may be present as described above in the first principle Component (Component (a)). Alternatively, these materials may be present in the other principal Components or may be incorporated separately into the reaction zone or mixture. The aromatic olefinic monomers may be separately incorporated in an amount such that there is present in the improved resins of the present invention less than about 35 percent reacted or combined aromatic olefinic monomers based on the total weight of the resin.

The resulting base resin may be used directly in various coating and/or printing compositions, but preferably is thereafter reacted with Component (d) (i.e., at least one ethylenically unsaturated lower aliphatic dicarboxylic acid or anhydride in an amount sufficient to produce a modified resin having an Acid Number higher than the Acid Number of the base resin. For example, from about one to ten parts of at least one ethylenically unsaturated lower aliphatic dicarboxylic acid or anhydride may be reacted with about ninety-nine to about ninety parts of the base resin, and preferably from about three to about five parts of the dicarboxylic acid or anhydride are reacted with about ninety-seven to about ninety-five parts of the base resin. The higher Acid Number value is desirable for reactivity with gelling agents and the dibasic acid-modified resin typically also exhibits an increased Ring and Ball softening point and an increased solution viscosity in relatively low solvent power ink solvents at 50 to 60% Wt. resin concentration.

The modified resin is useful when incorporated into a gelled varnish formulation, e.g., with an ink oil and a gelling agent. The higher Acid Number value provides a resin having desirable gel characteristics in such formulations.

The reaction between the dicarboxylic acid or anhydride and the base resin may be conducted over a wide range of temperatures depending upon the specific dicarboxylic acid or anhydride chosen and the specific base resin used. For example, reaction temperatures from about 180° C. to about 250° C., preferably from about 200° C. to about 240° C. may be used.

The reaction between the carboxylic acid or anhydride and the base resin is typically carried out in the absence of any catalyst, although a free radical initiator such as an organic peroxide, e.g., di-tertiary butyl peroxide and dicumyl peroxide, may be used. When such a catalyst is employed, reaction temperatures from about 100° C. to about 250° C., preferably from about 150° C. to about 230° C. and most preferably from about 180° C. to about 220° C. may be used. A solvent or diluent may also be incorporated.

The reaction pressures employed are not thought to be critical, with the pressure sufficient to prevent loss by evaporation of the reactants typically being used. Subatmospheric, atmospheric and superatmospheric pressures may be employed. Most preferably, the reaction is conducted under substantially oxygen-free conditions to prevent darkening of the color of the resulting resin. Conveniently, the reaction can be conducted under an inert gas blanket such as by passing nitrogen dioxide gas through the reaction vessel and over the reaction mixture. Any conventional stirred or agitated reaction vessel may be employed for the reaction, the reaction may be conducted in a batch, semicontinuous, or continuous manner.

In this invention the reaction between the anhydride or acid and the base resin is typically maintained at reaction temperature until the desired Acid Number is reached. Typically, the reaction will be maintained for a period sufficient to produce a modified resin having a Ring and Ball softening point of from about 110° C. to about 180° C., preferably from about 130° C. to about 175° C., and most preferably from about 140° C. to about 160° C. The modified resin has a definite Stoddard solubility of from about −60° C. to about 120° C., preferably from about −20° C. to about 90° C.; an Acid Number of from about 10.0 to about 40.0, and preferably from about 10.0 to about 30., and most preferably from about 10 to about 20; an ASTM Wijs Iodine number of from about 110 to about 190, preferably from about 120 to about 170 and a molecular weight (number average) of from about 1000 to about 2500, preferably from about 1400 to about 1800. The modified resin exhibits Gardner-Holdt solution viscosities at 25° C.

(bubble seconds) of from about 100 to about 2000, preferably from about 100 to about 600; a Hydrocarbon Dilution Tolerance test value (Wt.% Non-Volatile at Cloud Point) of from about 10.0 to about 40.0 (55%/Wt. resin in Magie 470 Ink Oil) preferably from about 15.0 to about 30.0; a Hydroxyl Number of from about zero to about 10.0, preferably from about zero to about 5.0. Reaction times may range from about one hour to about ten hours for example, and more typically may range from about three to about six hours.

The modified resin may then be recovered from the reaction mixture by conventional methods such as distillation, e.g., steam distillation or stripping, or other conventional recovery methods known to those skilled in this art.

"Acid Number" as used herein refers to a colorimetric method wherein approximately one gram of the resin is dissolved in 50 ml. of an Acid Number solution consisting of two parts of technical grade toluene, one part of technical grade isopropyl alcohol and a few drops of phenolphthalein indicator. The resin solution is then titrated with a 0.1N alcoholic potassium hydroxide solution (methanol) to a slight pink color. The Acid Number is then calculated as follows:

Acid Number=(ml. KOH Soln.)×(5.61)/(grams RESIN)

In the present invention, the modified resin is soluble in a wide variety of solvents including typical alphatic hydrogen solvents such as mineral spirits, methylethylketone (MEK), ink solvents, mineral oils, dioctyl phthalate, and tetrahydrofuran. Heat-set inks have a wide range of consistency which can range from being very thick or viscous down to about 500 centipoise viscosity, i.e., that viscosity range which is generally suitable for high speed web offset presses.

The acid-modified resins of the invention also exhibit "wetting" properties for ink pigments, and will release the ink solvent rapidly at drying temperatures.

The modified resins of the present invention may also be prepared by simultaneously reacting the five principal reaction components. Alternatively the five principal reactants (Components (a), (b), (c), (d) and (e)) may be polymerized or reacted in any sequence or combination to produce the novel resins of the present invention.

For example, the same proportion of components, i.e., either a predominant amount of Component (a), or from about 40 percent to about 85 percent; either a lesser amount of Component (b), or from about 5 percent to about 40 percent; either a lesser amount of Component (c), or from about 5 percent to about 30 percent; either a lesser amount of Component (d), (an ethylenically unsaturated lower aliphatic dicarboxylic acid or anhydride, for example maleic anhydride) or from about 1 percent to about 10 percent and either a lesser amount of Component (e), or from about 1 percent to about 10 percent may be heated in the reactor to a temperature of from about 200° C. to about 290° C., preferably from about 230° C. to about 270° C., and most preferably from about 255° C. to about 265° C. and held at reaction temperature for a reaction period of from about 12 hours to about 36 hours, preferably from about 16 hours to about 24 hours.

Where the reactor is sealed and unstirred, maximum pressures obtained during reaction are about 110 pounds per square inch at the end of the reaction period. The reactor is allowed to cool to about 140° C. over a period of about one and one-half hours. The resulting viscous molten polymers are processed, e.g., by steam distillation to remove unreacted solvents and oils. Such steam distillation may be carried out at temperatures of up to about 265° C.

The same range of acid-modified resin properties are obtained as when the previously described two-step process is used to react a base resin made from Components (a) plus (b) plus (c) plus (e) with an ethylenically unsaturated lower aliphatic dicarboxylic acid or anhydride, such as maleic anhydride.

The resins of this invention exhibit an unexpectedly high level and wide range of solubility-compatibility properties which permit the resins to be employed in the preparation of a wide variety of ink formulations. The resins of this invention can thus be utilized in relatively low solubility ink formulations as well as in medium and high solubility ink formulations. Preferably, these resins provide a desirable balance or intermediate range of both solubility and compatibility properties. That is, the resins are not too soluble or too insoluble, or too compatible or too incompatible for the various ink formulations in which they may be utilized. This is quite significant when it is realized that the exact degree of solubility and compatibility required for a particular ink formulation varies widely among the possible formulations in which the resins of this invention may be utilized. This is also true of the resins of the present invention.

Several factors are helpful in defining the solubility-compatibility properties of the resins of this invention. These factors include properties such as definite Stoddard solubility, resin aniline point and dilution tolerance value. The latter of the properties reflects the weight percent of ink solvent or ink oil which can be added in a stepwise manner to a clear solution of a modified resin of this invention (40–60 weight percent solution of a resin in a particular ink solvent or ink oil) before a cloudiness appears in the solution. Titration is performed with the same solvent or oil in which the starting resin is dissolved. Generally a dilution tolerance value of from about 20 to about 35 weight percent solids at incompatibility is desirable.

A Hydrocarbon Dilution Tolerance test method is later described by which the resin of the present invention have been evaluated.

The present invention will now be illustrated in terms of specific examples. In these examples, as well as in the other parts of the present specification and appended claims, it should be understood that all amounts and proportions of materials are expressed on a weight percent basis unless otherwise indicated.

The various materials used in the next 9 examples are described in Table 1.

TABLE I

PHYSICAL PROPERTIES OF COMPONENTS AND MATERIALS USED IN EXAMPLES 1-9

| Component (a) DCPD-Rich Hydrocarbon | Componenet (b) C-14 to C-16 | Component (c) Distilled |
|---|---|---|

TABLE I-continued
PHYSICAL PROPERTIES OF COMPONENTS AND MATERIALS USED IN EXAMPLES 1-9

| Analysis | Fraction | Alpha Olefin | Tall Oil | Component (d)[9] |
|---|---|---|---|---|
| Dicyclopentadiene - Wt. %[1] | 71.7-76.2 | | | |
| me-DCPD - Wt. %[1] | 4.3-2.1 | | | |
| Miscellaneous - Wt. %[1] | 25.0-21.7 | | | |
| | 100.0 | | | |
| Specific Gravity (60/60° F.)[2] | 0.946-0.947 | 0.780 | 0.970* | Maleic Anhydride |
| Gardner Color[3] | 1 | 1 | 8 | Tetrahydro-Phthalic Anhydride |
| Refractive Index[4] | 1.4950-1.4968 | 1.4348 | 1.5007 | |
| Acid Number[5] | — | — | 165.5 | |
| GH Viscosity @ 25° C., B.S.[6] | — | — | 17.7 | Fumaric Acid |
| Rosin Acids[7] | | | 35.7 | Itaconic Acid |
| Boiling Range, °C.[8] | | | | |
| IBP | | 250 | | |
| 5% | | 253 | | |
| 10% | | 255 | | |
| 50% | | 259 | | |
| 90% | | 270 | | |
| 95% | | 274 | | |
| END POINT | | 280 | | |

| | Hydrocarbon Diluent No. 1 | Component (e) Furfuryl Alcohol | Component (e) Allyl Alcohol | Component (f) OAO Gelling Agent Oxyaluminum Octoate[17] | Component (g) Magie 470 Ink Oil |
|---|---|---|---|---|---|
| Analysis | | | | | |
| Specific Gravity (60/60° F.)[2] | 0.9 | 1.1266 | 0.851 | — | — |
| Saybolt Color[10] | — | — | — | — | +22 |
| Gardner Color[3] | 2.5 | — | — | — | — |
| Refractive Index[4] | — | 1.4859 | 1.4194 | — | 1.4440-1.4460 |
| Acid Number[5] | — | — | — | — | — |
| GH Viscosity @ 25° C., B.S.[6] | — | — | — | — | — |
| Flash Point, °F.[11] | 75 | — | — | 152 | — |
| Boiling Range, °C.[8] | 90-300° | — | — | — | — |
| IBP | — | — | — | — | — |
| 5% | — | — | — | — | 245-250 |
| 10% | — | — | — | — | |
| 50% | — | — | — | — | 250-260 |
| 90% | — | — | — | — | |
| 95% | — | — | — | — | 270-275 |
| END POINT | — | — | — | — | |
| Aniline Point[12] | | | | | 70-80 |
| Total No. Of Components, Wt. % | | | | | |
| Below C-8 Hydrocarbons[13] | 27.5 | — | — | — | — |
| C-8 Hydrocarbons[14] | 27.9 | — | — | — | — |
| C-9 Hydrocarbons[15] | 36.9 | — | — | — | — |
| C-10, C-11 Hydrocarbons[16] | 7.7 | — | — | — | — |
| | 100.0 | | | | |
| Wt. % Aluminum | — | — | — | 8.4 | — |

*at 30° C.
TEST METHODS:
[1]GLC
[2]ASTM D 1298 (Specific Gravity)
[3]ASTM D 1544 (Gardner Color)
[4]ASTM D 1218 (Refractive Index)
[5]ASTM D 465 (Acid Number)
[6]ASTM D 1545 (Bubble Seconds)
[7]ASTM D 1585 (Fatty Acid Analysis of Tall Oil Rosin)
[8]ASTM D 850 (Distillation)
[9]Technical grades were used. Approximate melting points were: MA(57-70° C.), THPA (101-102° C.), Fumaric Acid (287° C.), and Itaconic Acid (161° C.)
[10]ASTM D 156 (Saybolt Color)
[11]ASTM D 93 (Flash Point - Penske Martin)
[12]ASTM D 611 (Aniline Point)
[13]GLC
[14]GLC
[15]GLC
[16]GLC
[17]As described elsewhere in Chattem Literature

TABLE II
COMPONENT AND PHYSICAL PROPERTY DATA FOR EXAMPLES 1a, 2-4d

| | Example 1a Wt. % | Example 2 Wt. % | Example 3 Wt. % | Example 4a Wt. % | Example 4b Wt. % | Example 4c Wt. % | Example 4d Wt. % |
|---|---|---|---|---|---|---|---|
| FEED | | | | | | | |
| Component (a) DCPD-Rich Hydrocarbon Fraction | 64.3 | 61.2 | 64.3 | 64.3 | 64.3 | 64.3 | 64.3 |

TABLE II-continued

COMPONENT AND PHYSICAL PROPERTY DATA FOR EXAMPLES 1a, 2–4d

| | Example 1a Wt. % | Example 2 Wt. % | Example 3 Wt. % | Example 4a Wt. % | Example 4b Wt. % | Example 4c Wt. % | Example 4d Wt. % |
|---|---|---|---|---|---|---|---|
| Component (b) | | | | | | | |
| Carbon No. | 14–16 | 14–16 | 14–16 | 14–16 | 14–16 | 14–16 | 14–16 |
| Alpha Olefin | 12.0 | 12.6 | 11.5 | 12.7 | 12.7 | 12.7 | 12.7 |
| Component (c) | 9.1 | 9.4 | 11.1 | 11.1 | 11.1 | 11.1 | 11.1 |
| Refined Tall Oil | | | | | | | |
| Component (e) | | | | | | | |
| Furfuryl Alcohol | — | 6.1 | — | — | — | — | — |
| Allyl Alcohol | — | — | 4.0 | 2.8 | 2.8 | 2.8 | 2.8 |
| Hydrocarbon Diluent | 14.6 | 10.7 | 9.1 | 9.1 | 9.1 | 9.1 | 9.1 |
| TOTALS | 100.0 | 100.0 | 100.0 | 100.0 | 100.0 | 100.0 | 100.0 |
| BASE RESIN | | | | | | | |
| Physical Properties | | | | | | | |
| Ring & Ball Softening Point, °C.[1] | 123.5 | 139 | 125 | 131.5 | 131.5 | 131.5 | 131.5 |
| Acid Number[2] | 2.7 | 2.5 | — | — | — | — | — |
| Hydroxyl Number[3] | 9.2 | 20.5 | — | — | — | — | — |
| Molecular Weight (Number Average)[4] | 1051 | — | — | — | — | — | — |
| Base Resin Yield, Wt. % | 75.6 | 81.2 | 81.9 | 79.8 | 79.8 | 79.8 | 79.8 |
| 55 Wt. % Base Resin Solution In Magie 470 Ink Oil | | | | | | | |
| Physical Properties | | | | | | | |
| Resin Color[5] | 11 | 17 | — | 15 | 15 | 15 | 15 |
| Gardner-Holdt Solution Viscosity at 25° C., Bubble Seconds[6] | 15 | — | — | 11 | 11 | 11 | 11 |
| Hydrocarbon Dilution Tolerance Wt. % Non-Volatile At Cloud Point[7] | <5 | — | — | — | — | — | — |
| Acid Modification Of Base Resin | | | | | | | |
| Component (d) - Identity | Maleic Anhydride | Maleic Anhydride | Maleic Anhydride | Maleic Anhydride | Tetra Hydro Phthalic Anhydride | Fumaric Acid | Itaconic Acid |
| Component (d) Amount - Parts/Wt. | 3.5 | 2.0 | 3.0 | 3.0 | 3.0 | 3.0 | 3.0 |
| Base Resin Amount - Parts/Wt. | 96.5 | 98.0 | 97.0 | 97.0 | 97.0 | 97.0 | 97.0 |
| Ethylenically Unsaturated Anhydride or Dicarboxylic Acid-Modified Resins | | | | | | | |
| Physical Properties | | | | | | | |
| Ring & Ball Softening Point, °C.[1] | 134.5 | 153 | 155 | 150 | 138.5 | 153 | 139.5 |
| Acid Number[2] | 20.6 | 11.4 | 13.5 | 15.1 | 11.6 | 14.7 | 12.5 |
| Hydroxyl Number[3] | 1.8 | 2.2 | — | 3.0 | — | 6.9 | 4.9 |
| Molecular Weight (Number Average)[4] | 1116 | — | — | — | — | — | — |
| Non-Gelled 55 Wt. % Acid-Modified Resin Solution In Magie 470 Ink Oil | | | | | | | |
| Physical Properties | | | | | | | |
| Resin Color[5] | 15 | — | — | 16 | — | 14+ | — |
| Gardner-Holdt Solution Viscosity at 25° C., Bubble Seconds[6] | 43 | — | — | 825 | — | 978 | — |
| Hydrocarbon Dilution Tolerance Wt. % Non-Volatile At Cloud Point[7] | 19.5 | — | — | 27.5 | — | 24.4 | — |
| Laray Viscosity[8] | | | | | | | |
| @ 2.5 sec$^{-1}$, 30° C., poise | 29 | — | — | 618 | — | 833 | — |
| @ 2500 sec$^{-1}$, 30° C., poise | 26 | — | — | 272 | — | 295 | — |
| Yield Value @ 2.5 sec$^{-1}$, dynes/cm$^{2(9)}$ | 72 | — | — | 1545 | — | 2083 | — |
| Shortness Factor[10] | 3 | — | — | 6 | — | 7 | — |
| High Shear Gelled Varnish 2.0 Wt. % OAO, 55 Wt. % Solution From Above In Magie 470 Ink Oil | | | | | | | |
| Physical Properties | | | | | | | |
| Laray Viscosity[8] | | | | | | | |
| @ 2.5 sec$^{-1}$, 30° C., poise | 148 | 2,444 | 32,003 | 5,401 | 2,351 | 1,360 | 1,146 |
| @ 2500 sec$^{-1}$, 30° C., poise | 48 | 326 | 525 | 432 | 80 | 471 | 118 |
| Yield Value @ 2.5 sec$^{-1}$, dynes/cm$^{2(9)}$ | 370 | 6,110 | 80,007 | 13,502 | 5,877 | 3,400 | 2,866 |

TABLE II-continued

COMPONENT AND PHYSICAL PROPERTY DATA FOR EXAMPLES 1a, 2–4d

| | Example 1a Wt. % | Example 2 Wt. % | Example 3 Wt. % | Example 4a Wt. % | Example 4b Wt. % | Example 4c Wt. % | Example 4d Wt. % |
|---|---|---|---|---|---|---|---|
| Shortness Factor[10] | 8 | 19 | 153 | 31 | 73 | 7 | 24 |

TEST METHODS:
[1] ASTM E 28 (R & B Softening Point)
[2] ASTM D 465 (Acid Number)
[3] ASTM E 222-73 (Hydroxyl Number)
[4] ASTM D 2503 (Molecular Weight)
[5] ASTM D 1544 (Gardner Color)
[6] ASTM D 1545 (Bubble Viscosity)
[7] As described elsewhere in present invention
[8] As described elsewhere in present invention
[9] As described elsewhere in present invention
[10] As described elsewhere in present invention

TABLE III

COMPONENT AND PHYSICAL PROPERTY DATA FOR EXAMPLES 1a, 5a, 6a

| | Example 1a* Wt. % | Example 5a* Wt. % | Example 6a* Wt. % |
|---|---|---|---|
| FEED | | | |
| Component (a) | | | |
| DCPD-Rich Hydrocarbon Fraction | 64.3 | 64.3 | 64.3 |
| Component (b) | | | |
| Carbon No. | 14–16 | 14–16 | 14–16 |
| Alpha Olefin | 12.0 | 12.0 | 12.7 |
| Component (c) | | | |
| Refined Tall Oil | 9.1 | 11.1 | 11.1 |
| Component (e) | | | |
| Allyl Alcohol | — | 3.5 | 2.8 |
| Hydrocarbon Diluent | 14.6 | 9.1 | 9.1 |
| TOTALS | 100.0 | 100.0 | 100.0 |
| BASE RESIN | | | |
| Physical Properties | | | |
| Ring & Ball Softening Point, °C.[1] | 123.5 | 122 | 126 |
| Acid Number[2] | 2.7 | 1.6 | 1.9 |
| Hydroxyl Number[3] | 9.2 | — | — |
| Molecular Weight (Number Average)[4] | 1051 | | |
| Base Resin Yield, Wt. % | 75.6 | 80.7 | 82.8 |
| 55 Wt. % Base Resin Solution In Magie 470 Ink Oil | | | |
| Physical Properties | | | |
| Gardner Color[5] | 11+ | 13 | 13 |
| Gardner-Holdt Solution Viscosity @ 25° C., Bubble Seconds[6] | 15 | 21 | 20 |
| Hydrocarbon Dilution Tolerance Wt. % Non-Volatile at Cloud Point[7] | <5 | 5.1 | <5 |
| Acid Modification Of Base Resin | | | |
| Component (d) - Identity | Maleic Anhydride | Maleic Anhydride | Maleic Anhydride |
| Component (d) Amount - Parts/Wt. | 3.5 | 3.5 | 3.0 |
| Base Resin Amount - Parts/Wt. | 96.5 | 96.5 | 97.0 |
| Maleic-Modified Resins | | | |
| Physical Properties | | | |
| Ring & Ball Softening Point, °C.[1] | 135.5 | 151 | 142.5 |
| Acid Number[2] | 20.6 | 14.8 | 14.9 |
| Hydroxyl Number[3] | 1.8 | 0 | 0 |
| Molecular Weight (Number Average)[4] | 1116 | 1670 | 1440 |
| Non-Gelled 55 Wt. % Maleic-Modified Resin Solution In Magie 470 Ink Oil | | | |
| Physical Properties | | | |
| Gardner Color[5] | 15 | 13 | 13 |
| Gardner-Holdt Solution Viscosity @ 25° C., Bubble Seconds[6] | 43 | 479 | 130 |
| Hydrocarbon Dilution Tolerance Wt. % Non-Volatile At Cloud Point[7] | 19.5 | 28 | 20 |
| Laray Viscosity[8] | | | |
| @ 2.5 sec$^{-1}$, 30° C., poise | 29 | 332 | 100 |
| @ 2500 sec$^{-1}$, 30° C., poise | 26 | 182 | 63 |
| Yield Value @ 2.5 sec$^{-1}$, dynes/cm$^{2(9)}$ | 72 | 831 | 250 |
| Shortness Factor[10] | 3 | 5 | 4 |
| High Shear Gelled Varnish 2.0 Wt. % OAO, 55 Wt. % Solution From Above In Magie 470 Ink Oil | | | |
| Laray Viscosity[8] | | | |
| @ 2.5 sec$^{-1}$, 30° C., poise | 148 | 13,710 | 4,306 |
| @ 2500 sec$^{-1}$, 30° C., poise | 48 | 575 | 280 |
| Yield Value @ 2.5 sec$^{-1}$, dynes/cm$^{2(9)}$ | 370 | 34,274 | 10,764 |
| Shortness Factor[10] | 4 | 60 | 39 |

TEST METHODS:
[1] ASTM E 28 (R & B Softening Point)
[2] ASTM D 465 (Acid Number)
[3] ASTM E 222-73 (Hydroxyl Number)
[4] ASTM D 2503 (Molecular Weight)
[5] ASTM D 1544 (Gardner Color)
[6] ASTM D 1545 (Bubble Viscosity)
[7] As described elsewhere in present invention
[8] As described elsewhere in present invention
[9] As described elsewhere in present invention
[10] As described elsewhere in present invention
NOTE: Experiments mared a* used High Shear Gel Procedure

TABLE IV

COMPONENT AND PHYSICAL PROPERTY DATA FOR EXAMPLES 1b, 5b, 6b, 7-9

| | Example 1b* Wt. % | Example 5b* Wt. % | Example 6b* Wt. % | Example 7 Wt. % | Example 8 Wt. % | Example 9 Wt. % |
|---|---|---|---|---|---|---|
| FEED | | | | | | |

TABLE IV-continued
COMPONENT AND PHYSICAL PROPERTY DATA FOR EXAMPLES 1b, 5b, 6b, 7-9

| | Example 1b* Wt. % | Example 5b* Wt. % | Example 6b* Wt. % | Example 7 Wt. % | Example 8 Wt. % | Example 9 Wt. % |
|---|---|---|---|---|---|---|
| Component (a) DCPD-Rich Hydrocarbon Fraction | 64.3 | 64.3 | 64.3 | 64.3 | 64.3 | 64.3 |
| Component (b) | | | | | | |
| Carbon No. | 14-16 | 14-16 | 14-16 | 14-16 | 14-16 | 14-16 |
| Alpha Olefin | 12.0 | 12.0 | 12.7 | 12.0 | 12.0 | 12.0 |
| Component (c) | 9.1 | 11.1 | 11.1 | 9.1 | 9.1 | 9.1 |
| Refined Tall Oil | | | | | | |
| Component (e) | | | | | | |
| Allyl Alcohol | — | 3.5 | 2.8 | 3.0 | 3.0 | 3.5 |
| Hydrocarbon Diluent | 14.6 | 9.1 | 9.1 | 11.6 | 11.6 | 11.1 |
| TOTALS | 100.0 | 100.0 | 100.0 | 100.0 | 100.0 | 100.0 |
| BASE RESIN | | | | | | |
| Physical Properties | | | | | | |
| Ring & Ball Softening Point, °C.[1] | 123.5 | 122 | 126 | 124 | 124 | 124 |
| Acid Number[2] | 2.7 | 1.6 | 1.9 | 1.8 | 1.4 | 1.3 |
| Hydroxyl Number[3] | 9.2 | — | — | 34.6 | 32.1 | 39.8 |
| Molecular Weight (Number Average)[4] | 1051 | — | — | 1149 | 1251 | 1108 |
| Base Resin Yield, Wt. % | 75.6 | 80.7 | 82.8 | 75.8 | 76.1 | 71.8 |
| Non-Gelled 55 Wt. % Base Resin Solution In Magie 470 Ink Oil | | | | | | |
| Physical Properties | | | | | | |
| Gardner Color[5] | 11+ | 13 | 13 | 12 | 13+ | 13+ |
| Gardner-Holdt Solution Viscosity @ 25° C., Bubble Seconds[6] | 15 | 21 | 20 | 19 | 19 | 23 |
| Hydrocarbon Dilution Tolerance Wt. % Non-Volatile at Cloud Point[7] | <5 | 5.1 | <5 | <5 | <5 | 5.7 |
| Acid Modification Of Base Resin | | | | | | |
| Component (d) - Identity | Maleic Anhydride | Maleic Anhydride | Maleic Anhydride | Maleic Anhydride | Maleic Anhydride | Maleic Anhydride |
| Component (d) Amount - Parts/Wt. | 3.5 | 3.5 | 3.0 | 3.5 | 4.0 | 3.0 |
| Base Resin Amount - Parts/Wt. | 96.5 | 96.5 | 97.0 | 96.5 | 96.0 | 97.0 |
| Maleic Modified Resins | | | | | | |
| Physical Properties | | | | | | |
| Ring & Ball Softening Point, °C.[1] | 134.5 | 151 | 142.5 | 148.5 | 149 | 149 |
| Acid Number[2] | 20.6 | 14.8 | 14.9 | 13.9 | 17.3 | 13.0 |
| Hydroxyl Number[3] | 1.8 | 0 | 0 | 6.6 | 0.4 | 0.9 |
| Molecular Weight (Number Average)[4] | 1116 | 1670 | 1440 | 1329 | 1481 | 1335 |
| Non-Gelled 55 Wt. % Maleic-Modified Resin Solution In Magie 470 Ink Oil | | | | | | |
| Physical Properties | | | | | | |
| Gardner Color[5] | 15 | 13 | 13 | 14+ | 13+ | 13+ |
| Gardner-Holdt Solution Viscosity at 25° C., Bubble Seconds[6] | 43 | 479 | 130 | 209 | 210 | 265 |
| Hydrocarbon Dilution Tolerance Wt. % Non-Volatile at Cloud Point[7] | 19.5 | 28 | 20 | 23.4 | 25.3 | 26.1 |
| Laray Viscosity[8] | | | | | | |
| @ 2.5 sec$^{-1}$, 30° C., poise | 29 | 332 | 100 | 151 | 162 | 222 |
| @ 2500 sec$^{-1}$, 30° C., poise | 26 | 182 | 63 | 96 | 105 | 125 |
| Yield Value @ 2.5 sec$^{-1}$, dynes/cm$^{2}$ [9] | 72 | 831 | 250 | 379 | 406 | 551 |
| Shortness Factor[10] | 3 | 5 | 4 | 4 | 4 | 4 |
| Cooked Procedure Gelled Varnish 2.0 Wt. % OAO, 55 Wt. % Solution From Above In Magie 470 Ink Oil | | | | | | |
| Laray Viscosity[8] | | | | | | |
| @ 2.5 sec$^{-1}$, 30° C., poise | 145 | 7391 | 3159 | 3129 | 3221 | 4525 |
| @ 2500 sec$^{-1}$, 30° C., poise | 54 | 367 | 133 | 303 | 323 | 392 |
| Yield Value @ 2.5 sec$^{-1}$, dynes/cm$^{2}$ [9] | 363 | 18476 | 7898 | 7822 | 8052 | 11313 |
| Shortness Factor[10] | 7 | 50 | 60 | 26 | 25 | 29 |

NOTE: Experiments marked b* used Cooked Gel Procedure
TEST METHODS:
[1] ASTM E 28 (R & B Softening Point)
[2] ASTM D 465 (Acid Number)
[3] ASTM E 222-73 (Hydroxyl Number)
[4] ASTM 2503 (Molecular Weight)
[5] ASTM D 1544 (Gardner Color)
[6] ASTM D 1545 (Bubble Viscosity)
[7] As described elsewhere in present invention
[8] As described elsewhere in present invention
[9] As described elsewhere in present invention
[10] As described elsewhere in present invention

EXAMPLE 1

In this example, as indicated in Table II, approximately 670 grams (700 ml) of an initial reaction mixture consisting of approximately 64.3 weight percent of a dicyclopentadiene-rich hydrocarbon fraction, approximately 12.0 weight percent of a C-14 to C-16 alpha olefin fraction, approximately 9.1 weight percent of a refined tall oil and approximately 14.6 weight percent of a hydrocarbon diluent were charged to a thermal polymerization bomb and reacted for a period of about 19 hours at a temperature of from about 245° C. to about 255° C. The dicyclopentadiene-rich hydrocarbon fraction contained approximately 73 percent dicyclopentadiene, 1 percent methyl and dimethyl dicyclopentadiene, and 12 percent miscellaneous C-10 to C-12 codimers. The properties of the C-14 to C-16 alpha olefin, and of the hydrocarbon diluent are listed in Table I. The diluent used (Hydrocarbon Diluent No. 1) was a by-product from a petroleum resin polymerization process.

The refined tall oil contained approximately 51 percent monomeric fatty acids, approximately 8 percent dimerized fatty acids, approximately 6 percent esterified fatty acids, approximately 33 percent rosin acids and approximately 2 percent unsaponifiables. The refined tall oil had a Gardner Color (ASTM D 1544) of about 7, a saponfication number of about 186 and a specific gravity at 25° C. of about 0.95.

At the end of the reaction period, 482 grams of a base resin was obtained having the physical properties shown in Table II.

About 96.5 parts by weight of the base resin was then reacted with about 3.5 parts by weight of maleic anhydride under an inert nitrogen blanket at a temperature of from about 220° C. to about 240° C. for about 3 hours.

The resulting maleic-modified hydrocarbon resin was found to have physical properties as set out in Table II.

The maleic-modified resin was divided into two portions. The first portion (Example 1a) was gelled using a High Shear procedure described as follows:

An approximately 55 weight percent solution of the maleic-modified resin was prepared by dissolving 110 grams resin (55 parts) in 82 grams of an ink oil (41 parts of Magie 470). A Waring Blender at high speed (18,000–20,000 rpm) was used to effect conditions of high shear. Complete solution was achieved within 5±2 minutes, during which time the heat generated by the shearing raised the temperature to 90° C. When the temperature reached 90° C., 12 grams of a slurry was added which contained 4 grams of oxyaluminum octoate (OAO), an aluminum type gelling agent, and 8 grams (4 parts) of Magie 470 Ink Oil. Agitation was continued under high shear conditions until the temperature reached 130° C. (approximately 10±2 minutes). Shearing was stopped; the gel was poured into a container and allowed to stand for 16–24 hours before further testing.

The resulting gelled varnish was found to have physical properties as set out in Table II.

The second portion (Example 1b) was gelled using a cooked procedure at a higher temperature and described as follows:

An approximately 55 weight percent solution of the maleic-modified resin in Magie 470 Ink Oil was prepared by charging 110 grams of resin (crushed) and 82 grams Magie 470 Ink Oil to a 500 ml., 3-neck flask, equipped with a sweep stirrer, thermometer, and Nitrogen inlet tube. The contents were stirred while heating to 160° C. to achieve complete solution (about 15–20 minutes), while maintaining a nitrogen atmosphere inside the flask. Stirring was continued while allowing to cool to 100° C. (about 1 minute), then a slurry was slowly added (15 seconds) which contained 4.0 grams of oxyaluminum octoate (OAO), an aluminum type gelling agent and 8.0 grams of Magie 470 Ink Oil. The contents of the flask were then heated back to 160° C., while stirring, (approximately 2 minutes) and were held for 30 min. at 160° C.±2° C. maintaining a nitrogen atmosphere throughout the procedure. Contents of the flask were then cooled to 100° C., and the gel poured into a container and allowed to stand overnight for 16–24 hours before further testing.

The resulting gelled varnish was found to have physical properties as set out in Table IV (Example 1b).

EXAMPLE 2

This was a repeat of Example 1 (Control) except that 4.0 weight percent of a Component (e), furfuryl alcohol was charged to the same thermal polymerization bomb and the proportions of Components (a), (b), (c), and the hydrocarbon diluent were slightly changed. The total charge ((a),(b),(c),(e) hydrocarbon diluent) was approximately 670 grams (700 ml.).

The dicyclopentadiene-rich hydrocarbon fraction was reduced from 64.3 to 61.2 weight percent; the C-14 to C-16 alpha olefin component was increased from 12.0 to 12.6 weight percent; the refined tall oil was increased from 9.1 to 9.4 weight percent; and the hydrocarbon diluent was reduced from 14.6 to 10.7 weight percent. All of these portions are shown in Table II. (See Example 2).

The same reaction conditions were used as in Example 1 and 465.5 grams of a base resin were recovered having the physical properties shown in Table II (See Example 2).

About 98.0 parts by weight of this base resin was next reacted with about 2.0 parts by weight of maleic anhydride using the same reaction conditions as in Example 1, and the resulting maleic-modified resin was found to have physical properties as set out in Table II (See Example 2).

As in Example 1a, a 55 weight percent solution of the maleic-modified resin in Magie 470 Ink Oil was prepared and gelled using the same High Shear procedure described in Example 1a.

The resulting gelled varnish was found to have physical properties as set out in Table II (See Example 2).

EXAMPLE 3

In the remaining Examples 3–9 (Tables II, III, and IV), allyl alcohol was used as Component (e).

This was a repeat of Example 1 (Control) except that 4.0 weight percent of a Component (e), allyl alcohol, was charged to the same thermal polymerization bomb and the proportions of Components (b), (c) and hydrocarbon diluent were slightly changed. The total charge ((a), (b), (c), (e), hydrocarbon diluent) was approximately 650 grams (700 ml.).

The dicyclopentadiene-rich hydrocarbon fraction remained the same at 64.3 weight percent; the C-14 to C-16 alpha olefin component was reduced from 12.0 to 11.5 weight percent; the refined tall oil was increased from 9.1 to 11.1 weight percent; and the hydrocarbon diluent was reduced from 14.6 to 9.1 weight percent.

All of these proportions are shown in Table II (Example 3).

The same reaction conditions were used as in Example 1 and 497 grams of a base resin were recovered having the physical properties shown in Table II (See Example 3).

About 97 parts by weight of this base resin was next reacted with about 3 parts by weight of maleic anhydride using the same reaction conditions as in Example 1, and the resulting maleic-modified resin was found to have physical properties as set out in Table II. (See Example 3).

As in Example 1a, a 55 weight percent solution of the maleic-modified resin in Magie 470 Ink Oil was prepared and gelled using the same High Shear procedure in Example 1a.

The resulting gelled varnish was found to have physical properties as set out in Table II (See Example 3).

EXAMPLE 4

This was a repeat of Example 1 (Control) except that 2.8 percent of a Component (e), allyl alcohol, was charged to a larger thermal polymerization bomb and the proportions of Components (b), (c), and hydrocarbon diluent were slightly changed. The total charge ((a),(b),(c),(e) hydrocarbon diluent) was approximately 4200 grams (4580 ml.).

The dicyclopentadiene-rich hydrocarbon fraction remained at 64.3 weight percent; the C-14 to C-16 alpha olefin component was increased from 12.0 to 12.7 weight percent; refined tall oil was increased from 9.1 to 11.1 weight percent; and the hydrocarbon diluent was reduced from 14.6 to 9.1 weight percent.

Initial reaction time and temperature were the same as Example 1 and at the end of the reaction period 3264 grams of a base resin were recovered having the physical properties shown in Table II (See Examples 4a, 4b, 4c, 4d).

One portion of this base resin, about 97.0 parts by weight, was then reacted with about 3.0 parts by weight of maleic anhydride under an inert nitrogen blanket at a temperature of from about 210° C. to about 230° C. for about 3 hours (Example 4a).

Using the same reaction conditions as in Example 4a, a second portion of this base resin, about 97.0 parts by weight, was then reacted with about 3.0 parts by weight of tetrahydrophthalic anhydride (Example 4b).

Using the same reaction conditions as in Example 4a, a third portion of this base resin, about 97.0 parts by weight, was then reacted with about 3.0 parts by weight of fumaric acid (Example 4c).

Using the same reaction conditions as in Example 4a, a fourth portion of this base resin, about 97.0 parts by weight, was then reacted with about 3.0 parts by weight of itaconic acid (Example 4d).

All four portions, each now modified by a different ethylenically unsaturated lower aliphatic dicarboxylic acid or anhydride were now separately gelled according to the High Shear procedure described in Example 1a.

The resulting four gelled varnishes were found to have physical properties as set out in Table II (See Examples 4a, 4b, 4c, 4d).

EXAMPLE 5

This was a repeat of Example 1, (Control) except that 3.5 weight percent of Allyl Alcohol (properties listed in Table I) were added as Component (e) to the blend charged to the thermal polymerization bomb. The refined tall oil Component was increased from 9.1 to 11.1 weight percent and the amount of hydrocarbon diluent was reduced from 14.6 weight percent to 9.1 weight percent. The proportions of the other Components charged to the thermal polymerization remained the same. All of these proportions are shown in Table III (See Example 5a) and in Table IV (See Example 5b).

The same reaction conditions were used in Example 1 and 618 grams of a base resin were recovered having the physical properties shown in Table III and Table IV (Examples 5a and 5b).

About 96.5 parts by weight or this base resin was next reacted with about 3.5 parts by weight of maleic anhydride using the same reaction conditions as in Example 1, (Control), and the resulting maleic-modified resin was found to have physical properties as set out in Table III and Table IV (Examples 5a and 5b).

The maleic-modified resin was divided into two portions. The first portion (Example 5a) was gelled using the High Shear procedure described in Example 1a.

The second portion (Example 5b) was gelled using the cooked procedure at a higher temperature described in Example 1b.

The two resulting gelled varnishes were found to have physical properties as set out in Table III (Example 5a) and in Table IV (Example 5b).

EXAMPLE 6

This was a repeat of Example 5, except that the Component (e), allyl alchol, was reduced from 3.5 to 2.8 weight percent; and the C-14 to C-16 alpha olefin component was increased from 12.0 to 12.7 weight percent.

The same reaction conditions were used as in Example 5, and 538 grams of a base resin were recovered having the physical properties shown in Table III (Example 6a) and in Table IV (Example 6b).

After reaction of this base resin in the proportion of about 97.0 parts by weight to about 3.0 parts by weight of maleic anhydride (a reduction from the 3.5 parts used in Example 5) and by using the same reaction conditions as in Example 5, the resulting maleic-modified resin was found to have physical properties as set out in Table III (Example 6a) and Table IV (Example 6b).

As with Example 5, the maleic-modified resin was divided into two portions.

One portion was used to prepare a 55 weight percent solution in Magie 470 Ink Oil and gelled according to the High Shear procedure described in Example 1a. Physical properties of the gelled varnish are given in Table III as Example 6a.

The remaining portion was used to prepare a 55 weight percent solution in Magie 470 Ink Oil and gelled according to the cooked gel procedure described in Example 1b; physical properties of the gelled varnish are given in Table IV as Example 6b.

EXAMPLE 7

This was a repeat of Example 5, except that the amount of Component (e), allyl alcohol, was reduced from 3.5 to 3.0 weight percent; the amount of Component (c), refined tall oil, was decreased from 11.1 to 9.1 weight percent; and the amount of hydrocarbon diluent accordingly increased from 9.1 to 11.6 weight percent. The amount of Components (a) and (b) remained the same.

Initial reaction time and temperature were the same as in Example 5 and at the end of the reaction period 473 grams of a base resin were recovered having the physical properties shown in Table IV (See Example 7).

This base resin, about 96.5 parts by weight, was then reacted with about 3.5 parts by weight of maleic anhydride (same as Example 5) under an inert nitrogen blanket at a temperature of from about 220° C. to about 240° C. for about 3 hours.

The resulting maleic-modified hydrocarbon resin was found to have properties as set out in Table IV (See Example 7).

A 55 weight percent solution of this maleic-modified resin was prepared in the same manner as in Example 1b and was gelled according to the cooked gel procedure as described in Example 1b.

The resulting gelled varnish was found to have physical properties as set out in Table IV (See Example 7).

EXAMPLE 8

This was a repeat of Example 7 in which the proportions of all Components (a),(b), (c), (e) and hydrocarbon diluent remained the same. All proportions are shown in Table IV (See Example 8).

The same reaction conditions were used as in Example 7 and 471 grams of a base resin were recovered having the physical properties shown in Table IV (See Example 8).

About 96.0 parts by weight of this base resin was next reacted with about 4.0 parts by weight of maleic anhydride (an increase from 3.5 in Example 7), using the same reaction conditions as in Example 7, and the resulting maleic-modified resin was found to have physical properties as set out in Table IV (See Example 8).

As in Example 1b, a 55 weight percent solution of the maleic-modified resin in Magie 470 Oil was prepared and gelled using the same cooked gel procedure as in Example 1b.

The resulting gelled varnish was found to have physical properties as set out in Table IV (See Example 8).

EXAMPLE 9

This was a repeat of Example 8. The same amounts of the same reactant Components (a), (b), and (c) were used; and the same Component (e), allyl alcohol, was increased from 3.0 to 3.5 weight percent and the same hydrocarbon diluent reduced accordingly from 11.6 to 11.1 weight percent. Reaction was carried out in the same manner as in Example 8 to produce a base resin having properties set out in Table IV (See Example 9).

About 97.0 parts by weight of this base resin was next reacted with about 3.0 parts by weight of maleic anhydride (a reduction from the 4.0 parts in Example 8) using the same reaction conditions as in Example 8, and the resulting maleic-modified resin was found to have physical properties as set out in Table IV (See Example 9).

As in Example 1b, an approximately 55 weight percent solution of the maleic-modified resin in Magie 470 Ink Oil was prepared and gelled using the same cooked gel procedure as in Example 1b.

The resulting gelled varnish was found to have physical properties as set out in Table IV (See Example 9).

Heat set inks based on synthetic resins have been known since the 1930's. High melting point resins with good solvent release at elevated temperatures are required. The ink solvents are generally narrow cut petroleum fractions, boiling from about 450°–600° F., which are relatively low in aromatic content and show relatively poor solvent power.

A more thorough discussion of heat set inks and various synthetic resins which have been used may be found in the following literature references which are hereby incorporated by reference. (1981) Encyclopedia of Chemical Technology, 3rd Edition, Vol. 13, Inks, pp 374–398; (1980) Printing Ink Handbook, National Association of Printing Ink Manufacturers, pages 22, 28, New York; (1979) The Printing Ink Manual, 3rd Edition, D. E. Bissett, Northwood Publications, Ltd., London, England; (1976) Printing Inks, Recent Developments, A. M. Wells, Chapter on "Lithographic Varnishes, Heat Set and Moisture Set Inks", pp 36–76, Noyes Data Corporation, Park Ridge, N.J.; (1970) "What the Lithographer Should Know About Ink", R. F. Reed, pages 2–4, (218 pp), Graphic Arts Technical Foundation, Inc., Pittsburgh, PA (6th Printing); (1969) Printing Ink Manual, 2nd Edition, W. Heffer & Sons Ltd., Cambridge, England; and (1967) Printing and Litho Inks, p 73. and p 120, H. J. Wolfe, MacNair-Dorland Co., New York A resin is usually required which can form a complete solution at room temperature at 50–70 weight percent resin solids, and the solution should desirably exhibit a relatively high solution viscosity. i.e. the resin must be very soluble, but form a very viscous solution.

Many resins exhibit an inverse relationship between their solubility and solution viscosity characteristics. That is, a very soluble resin will show less viscosity at the same percent solids; while a less soluble resin will show a higher viscosity at the same percent solids.

The drying time of litho inks prepared from heat set varnishes must be very short at printing speeds of up to 1500 feet per minute.

Among the properties sought for in a good printing ink resin are: fast solvent release, solvency in ink oils, good pigment wetting properties, tack required for good printing, and an acceptable compatibility with alkyds and other film formers.

The viscosity of heat set varnishes may be greatly increased by gelling. There are many procedures that can be used to produce a gelled varnish. Selection of time, temperature, gelling agent, and amount used, sequence of addition, agitation and solvent can all have a signficant effect on gel reactions.

Among the advantages achieved by gelling are: improvement in the sharpness of the printing quality of the inks; improvement of the gloss by reducing penetration into the paper stock; reduction in the tendency for ink flying or misting on high speed presses; and in lithographic inks there is improvement in water repellence.

In the present invention, the enhanced effect of Component (e), when present in base resin compositions (a), (b), (c) and (e) or in modified resin compositions (a), (b), (c), (d) and (e), is more particularly shown when a suitable gelling agent [Component (f)] is used to gel a solution of base resin or modified resin containing Component (e) in a suitable ink oil [Component (g)]. Suitable gelling agents [Component (f)] include a large variety of Aluminum-based gelling agents which are commercially available from Chattem Chemicals, 1715 W. 38th Street, Chattanooga, Tenn., 37409 or Joseph Ayers Inc., 275 Keystone Drive, Bethlehem, PA 18017. Those available include: aluminum soaps (octoate, stearate); aluminum alkoxides; aluminum chelates; and oxyaluminum acylates. Specific gelling compounds include; aluminum isopropoxide (AIP) with from 12.9 to 13.5% Alminum content; aluminum Tri-(sec-Butoxide) ASB, with from 10.7 to 11.2% Aluminum content; aluminum diisopropoxide stearate acetoacetic ester chelate (AIE-M), with from 9.3 to 10.3% Aluminum content; aluminum isopropoxide stearate acetoacetic ester chelate (AIS-E), with from 5.13 to 5.67% aluminum content; aluminum di-secondary butoxide acetoacetic ester chelate (ASE-M), with from 8.4 to 9.4% Aluminum content; aluminum (secondary butoxide stearate) ASB.4S, with from 7.8 to 8.6% Aluminum content; and Oxyaluminum octoate (OAO), with 8.0 to 8.8% Aluminum content.

In the present invention, the gelling agent (Component (f)), is used in an amount from about 1.0 to about 15.0%/Wt., and preferably in an amount from about 1.0 to about 5.0%/Wt., based on the total weight of all Components ((a),(b),(c),(d),(e), (f), and (g)) in the gelled varnish composition.

In the examples of this invention, the gelling agent known as OAO, or oxyaluminum octoate has been used at the 2.0 weight percent level in each of two different gelling procedures (High Shear and cooked), both of which are described in Example 1.

Suitable ink oils [Component (g)] include those solvents commonly used for gelled varnishes known as Magie Oils. These are marketed by Magie Brothers Oil Company, 9101 Fullerton Avenue, Franklin Park, IL., 60131. These include Magie 440, Magie 470, Magie 535, Magiesol 44, Magiesol 47 and Magiesol 52.

In the present invention, the ink oil (Component (g)), is used in an amount from about 20.0 to about 60.0%/Wt., preferably in an amount from about 35.0 to about 50.0%/Wt., and most preferably in an amount from about 40.0 to about 50.0%/Wt., based on the total weight of all Components ((a), (b), (c), (d), (e), (f) and (g)) in the gelled varnish compositions.

The preferred ink oils for heat-set inks are highly refined hydrocarbon oils which are relatively high boiling and boil within a relatively narrow range, e.g., between about 230° C. and 330° C. Particularly preferred are essentially aliphatic solvents which have a boiling range that does not extend over more than about a 50° C. interval, e.g., between about 250° C. and about 300° C., and which have a Kauri Butanol value of less than about 40 milliliters and preferably less than 35 milliliters (as compared to a value of 105 milliliters for toluene).

In the examples of this invention, Magie 470 Ink Oil was used throughout to prepare 55 weight percent solutions of base resin and maleic-modified resin for tests (see Table II, III, and IV) and further for gelling an approximately 55 weight percent solution of maleic-modified resin by one or both of the gelling procedures described in Example 1.

In addition to the measurement of solution viscosity of the base resin and of ungelled maleic-modified resin by the modified ASTM D 1545 Gardner-Holdt Viscosity Tubes, bubble seconds; Laray Viscosities, Yield Values and Shortness factors were also determined on both the non-gelled and gelled 55 weight percent solutions of maleic-modified resin.

The instrument used was a Laray Viscometer, Model number VM.01 manufactured by Adamel Lhomargy, 15 Ave. Jean-Jaures, 94201 Irvy-S/Seine, France. Operational booklet available with instrument.

When a Laray viscosity is run, the fall times, corrected for temperature, are used as the input for a computer program to give:
1. Laray Viscosity @ 2.5 sec$^{-1}$
2. Laray Viscosity @ 2500 sec$^{-1}$
3. Yield Value @ 2.5 sec$^{-1}$
4. Shortness Factor (Yield value @ 2.5 sec$^{-1}$/Laray Viscosity @ 2500 sec$^{-1}$)

The test procedure for Laray Viscosity (Neville Method N 4.11-84) is a modification of ASTM D-4040-81 run at 30° C. rather than 25° C.

GENERAL TEST DESCRIPTIONS

1. Viscosity; Laray @ 2.5 sec$^{-1}$, 30° C., poise

Viscosity of a test specimen, as measured by a falling rod viscometer, under low shear rate and low shear stress conditions. In this case, the viscosity is measured under enough shear stress to yield a 1000 sec. fall time which corresponds to a shear rate of 2.5 sec$^{-1}$.

2. Viscosity; Laray @ 2500 sec$^{-1}$, 30° C., poise

Viscosity of a test specimen, as measured by a falling rod viscometer, under high shear rate and high shear stress conditions. In this case, the viscosity is measured under enough stress to yield a 1 sec. fall time which corresponds to a shear rate of 2500 sec$^{-1}$.

$$\text{Viscosity} = \frac{\text{Shear Stress}}{\text{Shear Rate}} \quad \begin{array}{l} \text{Shear Stress} = \text{dynes/cm}^2 \\ \text{Shear Rate} = \text{sec}^{-1} \end{array}$$

$$\text{Viscosity} = \frac{\text{dynes/cm}^2}{\text{sec}^{-1}} = \text{dynes-sec/cm}^2 = \text{poise}$$

3. Yield Value: Dynes/cm$^2$

The shear stress required to induce a flow at a shear rate of 2.5 sec$^{-1}$.

4. Shortness Factor

Value used as an indicator as to the stiffness of a gel. It is defined as Yield Value @ 2.5 sec$^{-1}$/Laray Viscosity @ 2500 sec$^{-1}$.

5. Dilution Tolerance: Wt.% Non-Volatiles At Cloud Point

The solids content of a solution at the point where additional solvent can not be added before incompatibility occurs.

Dilution Tolerance is run on the un-gelled solution and not on the gelled varnish. Prepare a 55 weight percent resin solution in Magie 470. Weigh 10 g. solution into a tared 250 ml. Erlenmeyer flask with a magnetic stirrer in the flask. Add additional Magie 470 Oil from a buret while stirring the solution until the solution clouds when 10 point print is viewed vertically through the flask. Reweigh the flask and determine how much additional solvent has been added then calculate the solids content of the solution at this point. For example:

10 g. solution to start (5.5 g. resin/4.5 g. Magie 470)
12 g. Magie 470 added to cloud point
22 g. Total $$\frac{5.5 \text{ g. resin}}{22 \text{ g. Total}} \times 100 = 25\% \text{ Non-Volatiles at Cloud Point}$$

Example 1 represents the prior art (a), (b), (c) and (a), (b), (c), (d) compositions of '498, '410, and '100. The properties of the base resin and of the maleic-modified resin fall within the previously described property ranges.

In Example 4a, 2.8 weight percent Allyl Alcohol is used as Component (e). The base resin is reacted with 3.0 weight percent maleic anhydride to produce the maleic-modified resin which results from the use of Component (e) in the composition.

When the maleic-modified resins from Examples 1 and 4a are dissolved in Magie 470 we observe a large difference in non-gelled solution viscosity behavior for the resin containing Allyl Alcohol (Example 4a) as compared to that for the Control ((a), (b), (c), (d) composition), without Component (e), Example 1.

Example 4a (Allyl Alcohol) versus Example 1 (without Component (e)) shows about a 19 times increase (825/43) in Gardner-Holdt viscosity, shows about a 10 times increase (272/26) in 2500 sec$^{-1}$ Laray Viscosity, and shows about a 21 times increase (1,545/72) in yield value.

When the maleic modified resin in Magie 470 solution from Example 1 and 4a are gelled by the High Shear procedure (Table II) we observe a very large difference in gelled solution viscosity behavior for the resin containing Allyl Alcohol (Example 4a) as compared to that for the Control ((a), (b), (c), (d) composition), without Component (e), Example 1.

Example 4a (Allyl Alcohol) versus Example 1 (without Component (e)) shows about a 9 times increase (430/48) in the 2500 sec$^{-1}$ Laray Viscosity.

The increase in yield value is much greater with Example 4a (Allyl Alcohol) 13,502/370=about 36 times increase compared to Example 1 (without Component (e)).

Similar comparisons with Example 1 ((a), (b), (c), (d) compositions), without (e) can be made for Examples 2 and 3 ((a), (b), (c), (d), (e) compositions) in which Component (e) in Example 2 is 4.0 weight percent Furfuryl Alcohol and in which Component (e) in Example 3 is 4.0 weight percent Allyl Alcohol.

Examples in Table 4 used a different gelling procedure; the cooked gel procedure, described in 1b.

In those 3 examples for which both gelling procedures were used, results show that when Component (e) is present, the cooked gel procedure gives lower gelled values than does the Hi-Shear gel procedure.

|  | High Shear Example 1a | Cooked Example 1b | High Shear Example 5a | Cooked Example 5b | High Shear Example 6a | Cooked Example 6b |
|---|---|---|---|---|---|---|
| Laray Viscosity @ 2.5 sec$^{-1}$ 30° C., poise | 148 | 145 | 13,710 | 7,391 | 4.306 | 3,159 |
| Laray Viscosity @ 2500 sec$^{-1}$ 30° C., poise | 48 | 54 | 575 | 367 | 280 | 133 |
| Yield Value @ 2.5 sec$^{-1}$ dynes/cm$^2$ | 370 | 363 | 34,274 | 18,476 | 10,764 | 7,898 |
| Shortness Factor | 8 | 7 | 60 | 50 | 39 | 60 |

In considering Table IV, and the five Examples 5, 6, 7, 8, 9, all prepared by the cooked gel procedure, consider the separate combinations possible for the amount of Component (e)-Allyl Alcohol and the amount of Component (d)-Maleic Anhydride.

In comparing Example 7 and 8, we conclude that increasing the amount of maleic anhydride by 0.5 percent does not increase the gelled values.

| Example | Allyl Alcohol | M.A. | Laray Viscosities @ 2500 sec$^{-1}$ | Yield Value @ 2.5 sec$^{-1}$ |
|---|---|---|---|---|
| 8 | 3.0 | 4.0 | 323 | 8,052 |
| 7 | 3.0 | 3.5 | 302 | 7,822 |

Two additional comparisons suggest, in each case, that increasing the amount of Component (e), allyl alcohol, by 0.5 weight percent does significantly increase the gelled values below. The first comparison below, shows 3.5 weight percent maleic anhydride in each sample.

| Example | Allyl Alcohol | M.A. | Laray Viscosities @ 2500 sec$^{-1}$ | Yield Value @ 2.5 sec$^{-1}$ |
|---|---|---|---|---|
| 5 | 3.5 | 3.5 | 367 | 18,476 |
| 7 | 3.0 | 3.5 | 302 | 7,822 |
|  |  |  | +65 | +10,654 |

In the second comparison below, both examples show 3.0 weight percent maleic anhydride.

| Example | Allyl Alcohol | M.A. | Laray Viscosities @ 2500 sec$^{-1}$ | Yield Value @ 2.5 sec$^{-1}$ |
|---|---|---|---|---|
| 9 | 3.5 | 3.0 | 392 | 11,313 |
| 6 | 2.8 | 3.0 | 133 | 7,898 |
|  |  |  | +259 | +3,415 |

We may consider viscosity to be a resistance to flow and the yield value to be that point at which a liquid starts to flow under stress. A gravity flow would be 980 dynes/cm$^2$.

The highest Laray Viscosity at 2500 sec$^{-1}$, 30° C., poise is for the High Shear gelled varnish in Example 5a=575. Lowest is 48 for the High Shear gelled varnish in Example 1a, (Control).

The highest yield value at 2.5 sec$^{-1}$, dynes/cm$^2$ is for the High Shear gelled varnish in Example 3=80,007. Lowest is for the cooked gelled varnish in Example 1b=363, (Control).

The suggested broad and preferred limits for gelled varnishes comprising Components (a), (b), (c), (d), (e), (f), and (g) of this invention are

|  | Broad | Preferred |
|---|---|---|
| 1. Laray Viscosity @ 2500 sec$^{-1}$, 30° C., poise | 100–2,000 | 100–600 |
| 2. Yield Value @ 2.5 sec$^{-1}$, dynes/cm$^2$ | 2,500–100,000 | 2,500–30,000 |
| 3. Shortness Factor | 8–70 | 30–60 |

While there certainly is an upper limit for yield value, representing a rock-like solid, this only means that resins with such high values can not be used as the *sole* resin in a heat set varnish. Such very high yield value resins may have great utility for prior blending with other resins having very low yield values.

The main advantage of incorporating Component (e) in the invention resin is to make possible resin solutions with better gellability. The main advantage of these gelled higher yield value invention resin solutions in inks are: better drying time; reduced misting; sharper dot; better fountain solution resistance to emulsification; and better gloss.

The principles, preferred embodiments and modes of operation of the present invention have been described in the foregoing specifications. The invention which is intended to be protected here, however, is not to be construed as limited to the particular forms disclosed, since these are to be regarded as illustrative rather than restrictive. Variations and changes may be made by those skilled in the art without departing from the spirit of the present invention.

I claim:

1. A composition comprising:
   (a) a predominant amount of dicyclopentadiene; and lesser amounts of
   (b) at least one member selected from the group consisting of dimerized aliphatic cyclic and non-cyclic dienes of five carbon atoms; debutanized aromatic concentrates; C-5 olefins; acyclic conjugated C-5 dienes; monoolefins, diolefins, and polyenes each having more than five carbon atoms and having no aromatic rings; and
   (c) at least one member selected from the group consisting of tall oil; fatty acid-containing materials and rosin acid containing materials; and
   (d) at least one ethylenically unsaturated lower aliphatic dicarboxylic acid or anhydride; and
   (e) at least one member selected from the group consisting of materials containing two or more reactive groups, at least one of which must be a hydroxyl group.

2. The composition of claim 1 wherein Component (e) is at least one member selected from the group consisting of alcohols, glycols, glycerols, polyhydric alcohols, phenols and phenolic resins.

3. The composition of claim 2 wherein Component (e) is an alcohol selected from the group consisting of saturated aliphatic alcohols, ethylenically unsaturated aliphatic alcohols, saturated and unsaturated aromatic alcohols, saturated and unsaturated alicyclic alcohols, saturated and unsaturated heterocyclic alcohols, acetylenic alcohols, and saturated and unsaturated terpene alcohols.

4. The composition of claim 3 wherein Component (e) is an ethylenically unsaturated aliphatic alcohol.

5. The composition of claim 4 wherein Component (e) is allyl alcohol.

6. The composition of claim 3 wherein Component (e) is a saturated or unsaturated heterocyclic alcohol.

7. The composition of claim 6 wherein Component (e) is furfuryl alcohol.

8. The composition of claim 2 wherein Component (e) is a glycol selected from the group consisting of saturated glycols, polyethylene glycols and polypropylene glycols, (glycol ethers), ethylenically unsaturated glycols, and acetylenic glycols.

9. The composition of claim 2 wherein Component (e) is a glycerol selected from the group consisting of saturated glycerols and mono-glycerides, ethylenically unsaturated glycerols and mono-glycerides, and acetylenic glycerols and mono-glycerides.

10. The composition of claim 2 wherein Component (e) is a polyhydric alcohol selected from the group consisting of saturated polyhydric alcohols, sugars and sugar alcohols, ethylenically unsaturated polyhydric alcohols and acetylenic polyhydric alcohols.

11. The composition of claim 2 wherein Component (e) is a phenol selected from the group consisting of phenol, cresols, xylenols, alkyl and aryl phenols; dihydric phenols and bisphenols; and polyhydric phenols.

12. The composition of claim 2 wherein Component (e) is a phenolic resin selected from the group consisting of phenolic resins-novolak type, phenolic resins-resol type, and phenolic resins which have been modified by rosin, ester gum, or rosin derivatives.

13. The composition of claim 1 comprising:
   (a) from about forty to about eighty-five percent, by weight, of dicyclopentadiene;
   (b) from about five to about forty percent, by weight, of at least one member selected from the group consisting of dimerized aliphatic cyclic and non-cyclic dienes of five carbon atoms; debutanized aromatic concentrates; C-5 olefins; acyclic conjugated C-5 dienes; monoolefins, diolefins, and polyenes each having more than five carbon atoms and having no aromatic rings; and
   (c) from about five to about thirty percent, by weight, of at least one member selected from the group consisting of tall oil; fatty acid-containing materials and rosin acid-containing materials; and
   (d) from about one to about ten percent, by weight, of at least one ethylenically unsaturated lower aliphatic dicarboxylic acid or anhydride; and
   (e) from about one to about ten percent, by weight, of at least one member selected from the group consisting of materials containing two or more reactive groups, at least one of which must be a hydroxyl group.

14. The composition of claim 13 wherein Component (e) is present from about two to about six percent by weight.

15. The composition of claim 1, wherein said composition is reacted and has a Ring and Ball softening point from about 110° C. to about 180° C.; a Gardner-Holdt solution viscosity at 25° C. (bubble seconds) of from about 100–2,000 (55%/Wt. resin in Magie 470 Ink Oil); a Hydrocarbon Dilution Tolerance test value (Wt. % Non-Volatile at Cloud Point) of from about 10 to about 40 (55%/Wt. resin in Magie 470 Ink Oil); a Hydroxyl Number of from about zero to about 10.0; and an Acid Number of from about 10 to about 40.

16. A process for producing the composition of claim 1, in a reacted form comprising reacting
   (a) a predominant amount of dicyclopentadiene; and lesser amounts of
   (b) at least one member selected from the group consisting of dimerized aliphatic cyclic and non-cyclic dienes of five carbon atoms; debutanized aromatic concentrates; C-5 olefins; acyclic conjugated C-5 dienes; mono-olefins, diolefins, and polyenes each having more than five carbon atoms and having no aromatic rings; and
   (c) at least one member selected from the group consisting of tall oil; fatty acid-containing materials and rosin acid-containing materials; and
   (d) at least one ethylenically unsaturated lower aliphatic dicarboxylic acid or anhydride; and
   (e) at least one member selected from the group consisting of materials containing two or more reactive groups, at least one of which must be a hydroxyl group.

17. A composition comprising:
   (a) dicyclopentadiene; and
   (b) at least one member selected from the group consisting of dimerized aliphatic cyclic and non-cyclic dienes of five carbon atoms; debutanized aromatic concentrates; C-5 olefins; acyclic conjugated C-5 dienes; mono-olefins, diolefins, and polyenes each having more than five carbon atoms and having no aromatic rings; and
(c) at least one member selected from the group consisting of tall oil; fatty acid-containing materials and rosin acid-containing materials; and
(d) at least one ethylenically unsaturated lower aliphatic dicarboxylic acid or anhydride; and
(e) at least one member selected from the group consisting of materials containing two or more reactive groups, at least one of which must be a hydroxyl group; and
(f) at least one suitable gelling agent; and
(g) a suitable Ink Oil.

18. The composition of claim 17 comprising:
(a) from about 10 to about 60 percent, by weight, of dicyclopentadiene; and
(b) from about 1 to about 30 percent, by weight, of at least one member selected from the group consisting of dimerized aliphatic cyclic and non-cyclic dienes of five carbon atoms; debutanized aromatic concentrates; C-5 olefins; acyclic conjugated C-5 dienes; mono-olefins, diolefins, and polyenes each having more than five carbon atoms and having no aromatic rings, and
(c) from about 1 to about 25 percent, by weight, of at least one member selected from the group consisting of tall oil; fatty acid-containing materials and rosin acid-containing materials; and
(d) from about 0.25 to about 10 percent, by weight, of at least one ethylenically unsaturated lower aliphatic dicarboxylic acid or anhydride; and
(e) from about 0.25 to about 10 percent, by weight, of at least one member selected from the group consisting of materials containing two or more reactive groups, at least one of which must be a hydroxyl group; and
(f) from about 1 to about 15 percent, by weight, of at least one suitable gelling agent; and
(g) from about 20 to about 60 percent, by weight, of a suitable Ink Oil.

19. The composition of claim 17 wherein Component (f) is at least one aluminum-based gelling agent selected from the group consisting of Oxyaluminum octoate, Aluminum Diisopropoxide Acetoacetic Ester Chelate, and Aluminum Tri-(sec-Butoxide); and Component (g) is at least one ink oil selected from the group consisting of Magie 470, Magiesol 47, and Magie 535.

20. The composition of claim 17, comprising
(a) from about 15.0 to about 55.0 percent, by weight, of dicyclopentadiene; and
(b) from about 1.5 to about 25.0 percent, by weight, of at least one member selected from the group consisting of dimerized aliphatic cyclic and non-cyclic dienes of five carbon atoms; debutanized aromatic concentrates; C-5 olefins; acyclic conjugated C-5 dienes; mono-olefins, diolefins, and polyenes each having more than five carbon atoms and having no aromatic rings; and
(c) from about 2.0 to about 25.0 percent, by weight, of at least one member selected from the group consisting of tall oil; fatty acid containing materials and rosin acid-containing materials; and
(d) from about 0.5 to about 5 percent, by weight, of at least one ethylenically unsaturated lower aliphatic dicarboxylic acid or anhydride; and
(e) from about 0.5 to about 5 percent, by weight, of at least one member selected from the group consisting of materials containing two or more reactive groups, at least one of which must be a hydroxyl group; and
(f) from about 1.0 to about 5.0 percent, by weight, of at least one aluminum-based gelling agent selected from the group consisting of Oxyaluminum octoate, Aluminum Diisopropoxide Acetoacetic Ester Chelate, Aluminum Tri-(sec-Butoxide); and
(g) from about 35.0 to about 50.0 percent, by weight of at least one ink oil selected from the group consisting of Magie 470, Magiesol 47, and Magie 535.

21. The composition of claim 17, wherein said composition is reacted and gelled and has a Laray Viscosity (@ 2500 sec$^{-1}$, 30° C.; poise) value of from about 100 to about 2000; a Yield Value (@ 2.5 sec$^{-1}$, dynes/cm$^2$) of from about 2,500 to about 100,000; and a Shortness Factor value of from about 8 to about 70.

22. A process for producing the composition of claim 17, in a reacted form, comprising reacting
(a) from about 10 to about 60.0 percent, by weight, of dicyclopentadiene; and
(b) from about 1 to about 30 percent, by weight, of at least one member selected from the group consisting of dimerized aliphatic cyclic and non-cyclic dienes of five carbon atoms; debutanized aromatic concentrates; C-5 olefins; acyclic conjugated C-5 dienes; mono-olefins, diolefins, and polyenes each having more than five carbon atoms and having no aromatic rings; and
(c) from about 1 to about 25 percent, by weight, of at least one member selected from the group consisting of tall oil; fatty acid-containing materials and rosin acid-containing materials; and
(d) from about 0.25 to about 10 percent, by weight, of at least one ethylenically unsaturated lower aliphatic dicarboxylic acid or anhydride; and
(e) from about 0.25 to about 10 percent, by weight, of at least one member selected from the group consisting of materials containing two or more reactive groups, at least one of which must be a hydroxyl group;
to form a reacted product, then further mixing the reacted product with
(f) from about 1.0 to about 15 percent, by weight, of at least one suitable gelling agent; and
(g) from about 20 to about 60 percent, by weight, of a suitable ink oil, and gelling the solutions.

23. A composition comprising
(a) a predominant amount of dicyclopentadiene; and lesser amounts of
(b) at least one member selected from the group consisting of dimerized aliphatic cylic and non-cyclic dienes of five carbon atoms; debutanized aromatic concentrates; C-5 olefins; acyclic conjugated C-5 l dienes; mono-olefins, diolefins, and polyenes each having more than five carbon atoms and having no aromatic rings; and
(c) at least one member selected from the group consisting of tall oil; fatty acid-containing materials and rosin acid-containing materials; and
(e) at least one member selected from the group consisting of materials containing two or more reactive groups, at least one of which must be a hydroxyl group.

24. The composition of claim 23 comprising (a) from about forty to about eighty-five percent, by weight of dicyclopentadiene; and (b) from about five to about forty percent, by weight, of at least one hydrocarbon selected from the group consisting of dimerized aliphatic cyclic and non-cyclic dienes of five carbon atoms; debutanized aromatic concentrates; C-5 olefins; acyclic conjugated C-5 dienes; mono-olefins, diolefins, and polyenes each having more than five carbon atoms and having no aromatic rings; and (c) from about five to about thirty percent, by weight, of at least one member selected from the group consisting of tall oil; fatty acid-containing materials and rosin acid-containing materials; and (e) from about one to about ten percent, by weight, of at least one member selected from the group consisting of materials containing two or more reactive groups, at least one of which must be a hydroxyl group.

25. The composition of claim 23, wherein said composition has a Ring and Ball softening point of from about 100° C. to about 170° C.; a Gardner-Holdt solution viscosity at 25° C. (bubble seconds) of from about 15.0 to about 50.0 (55%/Wt. resin in Magie 470); a Hydrocarbon Dilution Tolerance test value (Wt. % Non-Volatile at Cloud Point) of from about 1.0 to about 10.0 (55%/Wt. resin in Magie 470); a Hydroxyl Number of from about 10.0 to about 60.0; and an Acid Number of from about 1.0 to about 10.0.

26. A process for producing the composition of claim 23, in a reacted form, comprising reacting (a) a predominant amount of dicyclopentadiene; and lesser amounts of (b) at least one member selected from the group consisting of dimerized aliphatic cyclic and non-cyclic dienes of five carbon atoms; debutanized aromatic concentrates; C-5 olefins; acyclic conjugated C-5 dienes; mono-olefins, diolefins, and polyenes each having more than five carbon atoms and having no aromatic rings; and (c) at least one member selected from the group consisting of tall oil; fatty acid-containing materials and rosin acid-containing materials; and (e) at least one member selected from the group consisting of materials containing two or more reactive groups, at leas one of which must be a hydroxyl group.

* * * * *